US007865218B2

(12) United States Patent
Iguchi et al.

(10) Patent No.: US 7,865,218 B2
(45) Date of Patent: Jan. 4, 2011

(54) RECEIVING DEVICE, INTEGRATED CIRCUIT, PROGRAM, AND RECEIVING METHOD

(75) Inventors: Noritaka Iguchi, Osaka (JP); Ryosuke Mori, Osaka (JP); Tetsuya Yagi, Osaka (JP); Koji Setoh, Osaka (JP); Daisuke Hayashi, Osaka (JP); Ippei Kanno, Kyoto (JP)

(73) Assignee: Panasonic Corporation, Osaka (JP)

( * ) Notice: Subject to any disclaimer, the term of this patent is extended or adjusted under 35 U.S.C. 154(b) by 959 days.

(21) Appl. No.: 10/588,270

(22) PCT Filed: Dec. 2, 2005

(86) PCT No.: PCT/JP2005/022186

§ 371 (c)(1),
(2), (4) Date: Mar. 20, 2007

(87) PCT Pub. No.: WO2006/062040

PCT Pub. Date: Jun. 15, 2006

(65) Prior Publication Data
US 2007/0281757 A1 Dec. 6, 2007

(30) Foreign Application Priority Data
Dec. 8, 2004 (JP) ............................. 2004-355127
Apr. 8, 2005 (JP) ............................. 2005-111979

(51) Int. Cl.
*H04B 1/38* (2006.01)
(52) U.S. Cl. .................. 455/574; 455/522; 455/69; 455/343.1; 455/343.2; 455/343.3; 370/311; 370/318; 713/300; 713/320
(58) Field of Classification Search ................ 455/522, 455/574, 69, 343.1–343.4; 370/311, 318; 713/300, 320
See application file for complete search history.

(56) References Cited
U.S. PATENT DOCUMENTS

| 2002/0016933 | A1* | 2/2002 | Smith et al. ................... 714/4 |
| 2003/0153369 | A1 | 8/2003 | Laiho et al. |
| 2005/0013274 | A1* | 1/2005 | Pekonen et al. ............. 370/329 |
| 2006/0239299 | A1* | 10/2006 | Scheid et al. ............... 370/474 |
| 2007/0186133 | A1* | 8/2007 | Stare .......................... 714/746 |

(Continued)

FOREIGN PATENT DOCUMENTS

JP  10-107748  4/1998

(Continued)

*Primary Examiner*—Kamran Afshar
*Assistant Examiner*—Babar Sarwar
(74) *Attorney, Agent, or Firm*—Wenderoth, Lind & Ponack, L.L.P.

(57) ABSTRACT

A receiving device performs reception in a service period of a broadcast signal and switches to a power saving mode in a non-service period. The service period is composed of a first period during which an application data table of an MPE-FEC frame is transmitted and a second period, following the first period, during which an RS data table of the MPE-FEC frame is transmitted. An error correction unit 12 performs one of error correction that uses the whole RS data table according to MPE-FEC, and erasure correction that uses a same number of parity bytes as bytes having bit errors. When the bit errors are corrected by the error correction unit 12 performing erasure correction, a power control unit 30 switches a receiving circuit to a power saving mode before the second period ends.

9 Claims, 23 Drawing Sheets

U.S. PATENT DOCUMENTS

| | | | |
|---|---|---|---|
| 2009/0060093 A1* | 3/2009 | Narahari et al. | 375/340 |
| 2010/0111168 A1* | 5/2010 | Villion et al. | 375/240.12 |
| 2010/0135444 A1* | 6/2010 | Lin | 375/346 |
| 2010/0144326 A1* | 6/2010 | Wilhelmsson | 455/414.1 |

FOREIGN PATENT DOCUMENTS

| | | |
|---|---|---|
| JP | 2002-044012 | 2/2002 |
| JP | 2003-264531 | 9/2003 |

* cited by examiner

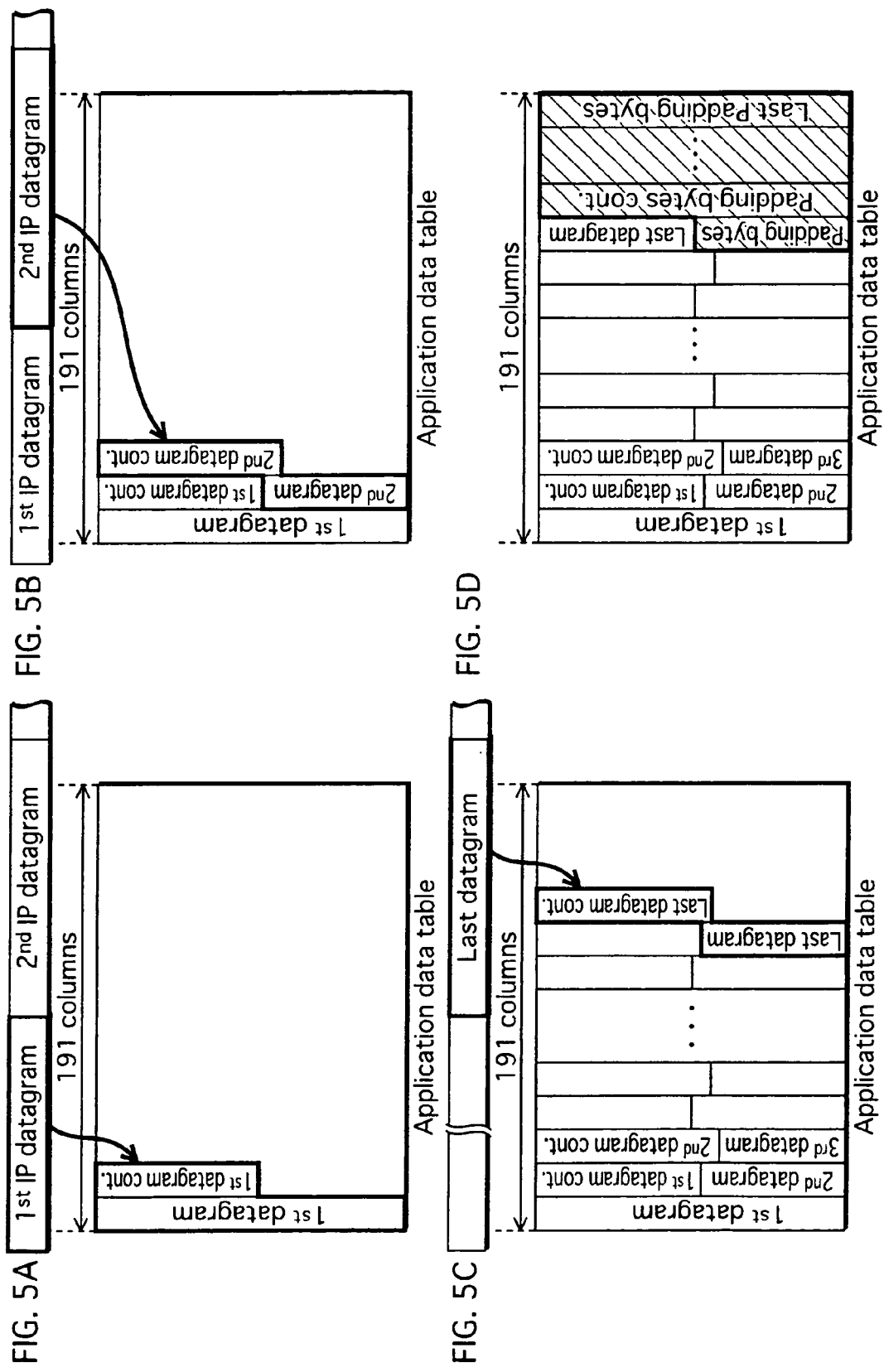

→ : Erasure correction for each row (191-byte data) constituting application data table Byte positions having bit errors in 191-byte row are known
→ errors can be corrected by erasure correction if
three pieces of parity data are available

| Result of RS (204, 188, 16) for TS packet in section | | Result of CRC-32 for section | |
|---|---|---|---|
| | | Result of CRC-32 = reliability A | Result of CRC-32 = reliability B |
| | Entirely reliability A | Section reliability =A | Section reliability =A |
| | Partly reliability B | Section reliability =A | Section reliability =B |

When number of ○ reaches 191 in each row, finish adding MPE-FEC section and switch to power saving mode Add first MPE-FEC section Add second MPE-FEC section
(including byte of reliability B)

Add third MPE-FEC section

When number of ○ reaches 191 in each row, finish adding MPE-FEC section and switch to power saving mode

RECEIVING DEVICE, INTEGRATED CIRCUIT, PROGRAM, AND RECEIVING METHOD

TECHNICAL FIELD

The present invention belongs to a technical field of power saving control in receiving operations.

BACKGROUND ART

Power saving control in receiving operations is conducted in the following manner. In a case where a plurality of programs are transmitted in a time division manner in digital broadcasting, power to a demodulation unit and the like is supplied only during a period when a desired program is being transmitted, and stopped during a period when the desired program is not being transmitted, to reduce power consumption. With the widespread use of mobile receiving devices in recent years, increasing attention has been given to this technique.

In a broadcast signal in which a plurality of programs are time division multiplexed, a period when a desired program is being transmitted is called a "burst".

For example, patent document 1 discloses a known technique of intermittently supplying power according to arrival of such a burst.

According to the technique described in patent document 1, time interval information showing a relative time interval to a next burst is included in each burst, so that a receiving device can be informed of when the next burst arrives based on this time interval information. Since the receiving device is informed of when the next burst arrives, the receiving device can stop the power supply until the arrival of the next burst.

Thus, according to this technique, power is stopped while bursts are not being received. Therefore, in a case where reception is performed by a mobile device, the power consumption can be reduced and as a result a longer battery life can be attained.

Patent document 1: U.S. Patent Application Publication No. 2003/0153369

DISCLOSURE OF THE INVENTION

Problems the Invention is Going to Solve

In the conventional method described in patent document 1, power is stopped during periods other than bursts, but continues to be supplied during bursts. There is no concept of reducing the power consumption during the arrival of bursts as well.

In development of such receiving devices that perform mobile reception, a highest market requirement may be a further reduction in power consumption. However, since a burst in a broadcast signal basically contains all information necessary for reproduction of broadcast contents, not to receive part of the burst may cause a partial loss of the broadcast contents. Thus, there is a difficulty in responding to both a power saving requirement and a quality requirement.

The present invention aims to provide a receiving device that can achieve a further reduction in power consumption while satisfying the quality requirement.

Means of Solving the Problems

To achieve a further reduction in power consumption, the present invention focuses attention on a property of an error correction method used in a broadcast method directed at mobile devices. The property of the error correction method in the broadcast method directed at mobile devices is the following: a stronger error correction function is used in addition to an error correction function of a broadcast method directed at stationary devices.

Here, compare error correction in DVB-H (Digital Video Broadcast-Handheld) with error correction in DVB-T (Digital Video Broadcast-Terrestrial). DVB-T is a digital broadcast method for stationary devices in Europe, whereas DVB-H is a digital broadcast method for mobile devices currently under study. In DVB-T, a transmitter encodes a signal using code such as convolutional code or RS (Reed-Solomon) code for TS (Transport Stream) packets, and a receiver performs error correction such as Viterbi decoding and RS decoding, to thereby reproduce correct data.

In DVB-H, meanwhile, an error correction function called MPE-FEC (Multiprotocol Encapsulation-Forward Error Correction) that performs RS coding on IP (Internet Protocol) datagrams is used in addition to the RS coding and convolutional coding performed on TS packets in DVB-T.

Thus, DVB-H uses the MPE-FEC error correction function in addition to the error correction function of DVB-T. In the case of mobile reception, there are cases where a receiving environment may be bad. To prevent a failure of error correction in such cases, the MPE-FEC error correction function is additionally adopted in DVB-H.

As a result of the addition of the MPE-FEC error correction function, a burst in DVB-H has a structure in which a period (first period) when data corresponding to an application data table is transmitted is followed by a period (second period) when parity data corresponding to an RS data table is transmitted.

In view of such a burst structure, a receiving device according to the present invention is a receiving device that performs reception in a service period of a broadcast signal and switches to a power saving mode in a non-service period, the service period being composed of a first period during which an application data table is transmitted and a second period, following the first period, during which an RS data table is transmitted, including: a receiving circuit operable to perform reception in the first period to obtain the application data table, and perform reception in the second period; an error correction unit operable to selectively perform first correction that uses the whole RS data table and second correction that uses a part of the RS data table, to correct a bit error in the obtained application data table; and a switching unit operable to, when the bit error is corrected as a result of the error correction unit performing the second correction, switch to the power saving mode before the second period ends.

EFFECTS OF THE INVENTION

According to the above construction, the first correction that uses parity data of the whole RS data table and the second correction that uses parity data of part of the RS data table are selectively performed. When the second correction is performed, the receiving device can be switched to the power saving mode without waiting for the end of the second period. This contributes to a further reduction in power consumption.

The switching to the power saving mode during the second period is made only when the second correction is performed. Accordingly, the receiving device will not suffer from a drop in receiving quality. Hence the receiving device according to the present invention can achieve a further reduction in power consumption while satisfying the quality requirement.

Here, the application data table may be made up of a plurality of bytes arranged in a matrix, wherein the receiving device further includes: a detection unit operable to, when the receiving circuit obtains the application data table, detect a position of each byte which has the bit error, in each row of the obtained application data table, the second correction is erasure correction that, if the detection unit detects the position of each byte which has the bit error in the row, corrects the bit error by using a same number of parity bytes as bytes which each have the bit error, and the switching to the power saving mode by the switching unit is performed when, in the second period, the same number of parity bytes as the bytes which each have the bit error are added to the row.

According to the above construction, the number of parity bytes to be received can be increased or decreased in accordance with how many bit errors are present in each row of the application data table. Upon receiving the number of parity bytes sufficient for erasure correction, the receiving device can be switched to the power saving mode. Since the switching to the power saving mode is accelerated in this way, the receiving device can stay in the power saving mode in a longer duration, with it being possible to achieve a longer battery life.

Here, the receiving device may further include: a detection unit operable to detect information showing a receiving environment of the broadcast signal, wherein if the detected information satisfies a predetermined condition, the switching unit switches to the power saving mode before the second period begins, and if the detected information does not satisfy the predetermined condition, the error correction unit performs one of the first correction and the second correction.

In a case where the receiving device performs mobile reception, the receiving environment changes depending on factors such as, for example, a moving speed of the receiving device and existence of surrounding obstacles. For example, if the receiving device is located in a place without obstacles or is moving slowly, the correct application data table can be obtained with there being no need to use any of the parity data of the RS data table. In such a case, the parity data of the RS data table is unnecessary, so that the receiving device is switched to the power saving mode without waiting for the arrival of the second period. Hence the receiving circuit can stay in the power saving mode in a longer duration.

BRIEF DESCRIPTION OF THE DRAWINGS

FIG. 5 shows how a plurality of IP datagrams in IP data are stored in an application data table.

DESCRIPTION OF REFERENCE NUMERALS

Figure 1:
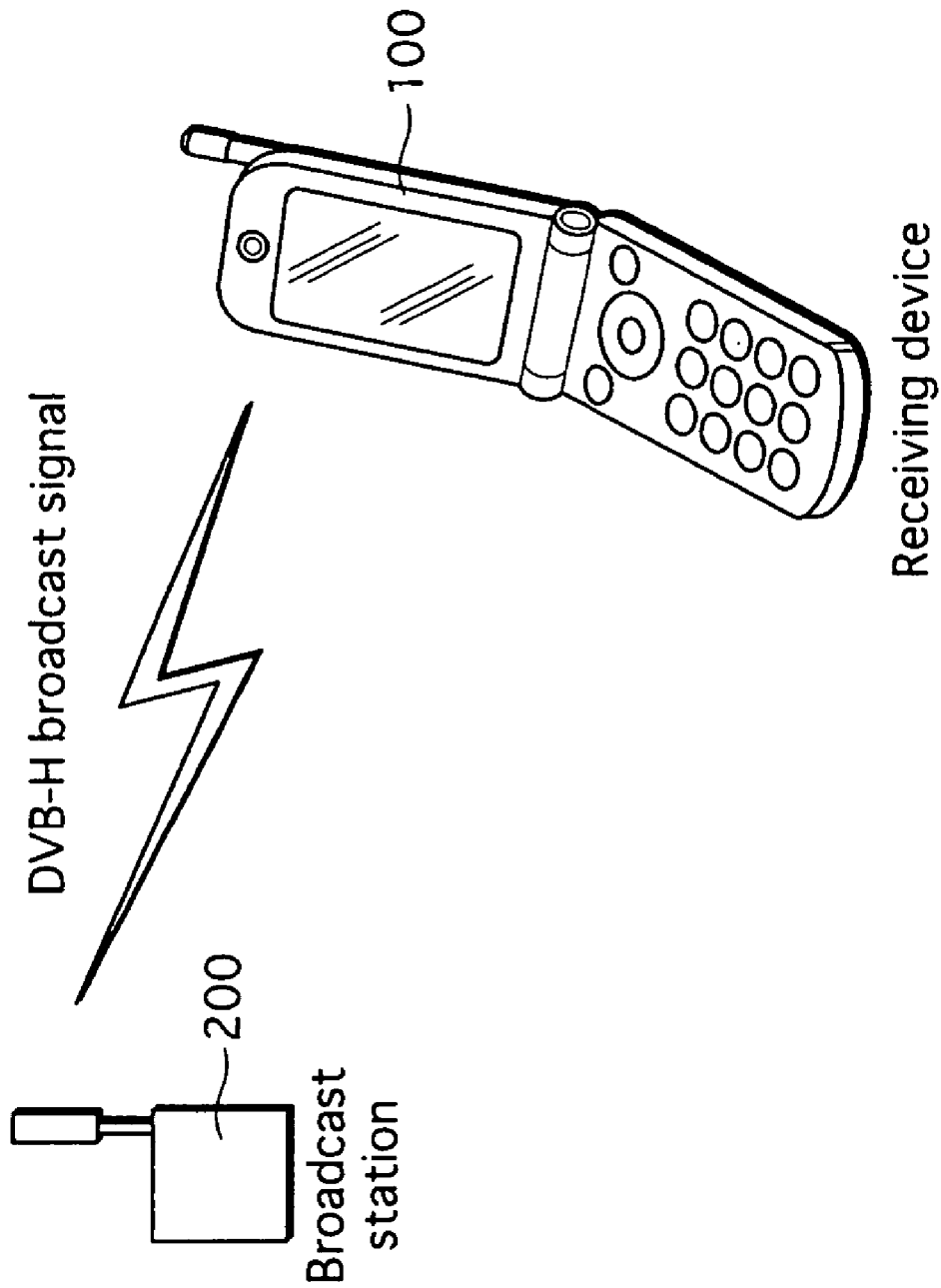
FIG. 1 shows a construction of a system in which a receiving device 100 is used.

1 . . . antenna
2 . . . tuner
3 . . . demodulation unit
4 . . . time information extraction unit
5 . . . IP data reproduction unit
6 . . . receiving environment detection unit
10 . . . demodulation circuit
11 . . . frame storage unit
12 . . . error correction unit
13 . . . reliability information table storage unit
14 . . . section reliability determination unit
15 . . . FEC control unit
20 . . . MPE-FEC unit
30 . . . power control unit
100 . . . receiving device
200 . . . broadcast station

BEST MODE FOR CARRYING OUT THE INVENTION

<Receiving Device in a System>

FIG. 1 shows a construction of a system in which a receiving device 100 is used. This system performs digital broadcasting for a mobile terminal. The receiving device 100 is a mobile device for receiving a broadcast in the mobile terminal, and also has a function as a mobile phone. This being so, the receiving device 100 receives a DVB-H broadcast signal from a broadcast station 200 and reproduces video and/or audio.

According to DVB-H, program data of a same channel is transmitted in time-division multiplexing by appropriating a band of about 7 MHz per program. DVB-H adopts OFDM (Orthogonal Frequency Division Multiplexing). OFDM is a multi-carrier transmission technique that uses a plurality of orthogonal sub-carriers within a transmission band. According to this technique, the transmission band is divided by the plurality of sub-carriers, so that a duration of each symbol can be made longer, which contributes to a high resistance against multipath interference. OFDM with such characteristics is widely used not only in DVB-T and DVB-H but also in ISDB-T (Integrated Service Digital Broadcasting-Terrestrial) which is Japan's terrestrial digital broadcasting format, wireless LAN, fourth-generation mobile phones, and the like.

<Relationship between the Broadcast Signal and the Mode Switching>

Figure 2:
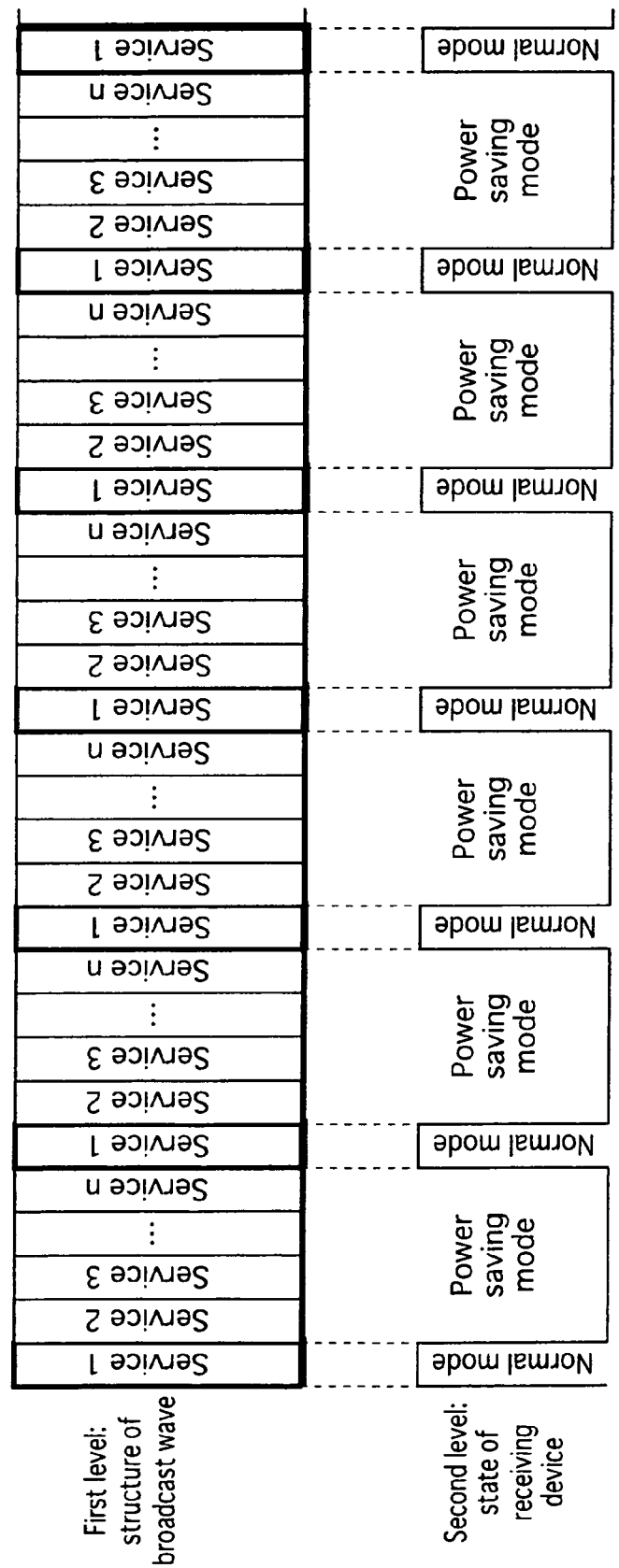
FIG. 2 shows a correspondence between a broadcast signal transmitted from a broadcast station 200 and a state of the receiving device.

FIG. 2 shows a correspondence between the broadcast signal transmitted from the broadcast station 200 and a state of the receiving device 100. On the first level, bursts of n services are time-division multiplexed in the broadcast signal. Suppose the receiving device 100 receives bursts of service 1 out of the n services. Then the receiving device 100 is in a normal mode in the bursts of service 1, and in a power saving mode in periods other than the bursts of service 1, as shown on the second level.

<Burst Structure>

Figure 3:
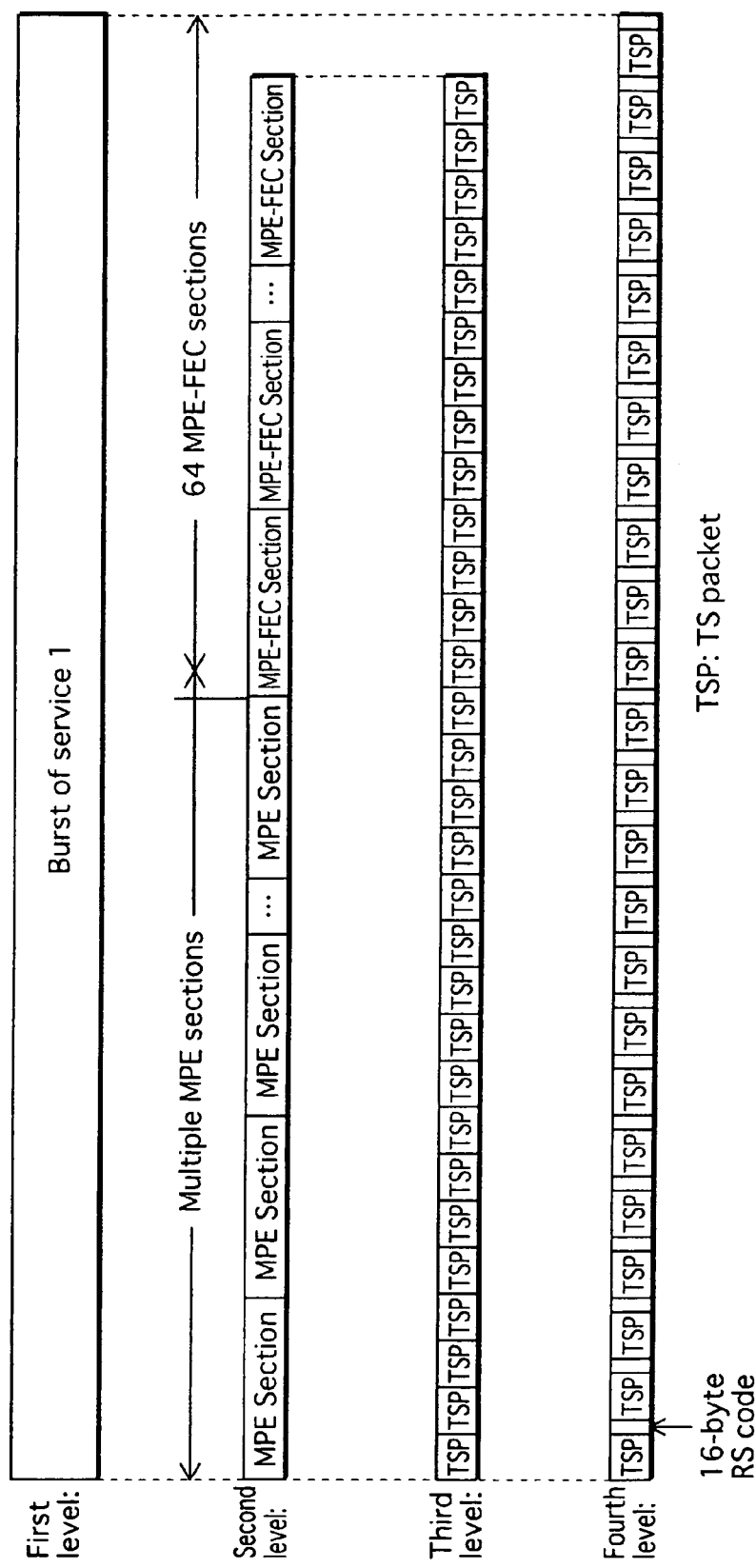
FIG. 3 shows a structure of a burst of one service.

FIG. 3 shows a structure of a burst of one service. In the drawing, the first level shows a burst of service 1, and the second level shows an internal structure of that burst. The burst of service 1 is made up of a first period when a plurality of MPE sections are transmitted and a second period when 64 MPE-FEC sections are transmitted. These MPE sections and MPE-FEC sections are converted to TS packets (on the third level), RS-16 (16-byte RS code) is added to each TS packet (on the fourth level), and then OFDM modulation is performed on the TS packets to which the RS-16 has been added. The outcome is transmitted from the broadcast station 200 to the receiving device 100.

Figure 4:
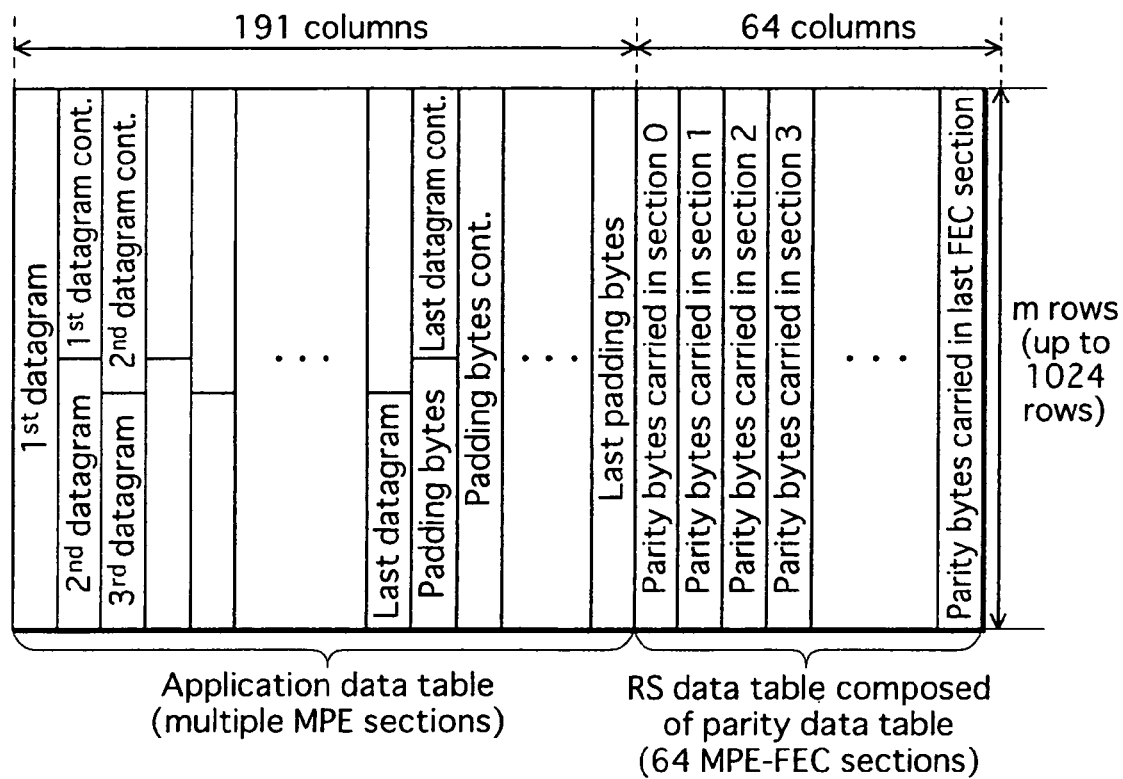
FIG. 4 shows a structure of an MPE-FEC frame.

FIG. 4 shows a structure of an MPE-FEC frame. The MPE-FEC frame is a coding table for coding IP datagrams. The MPE-FEC frame is made up of m rows×255 columns. The number of rows m is variable up to 1024. First m rows×191 columns of the MPE-FEC frame are called an application data table, in which the IP datagrams are stored. Latter m rows×64 columns of the MPE-FEC frame are called an RS data table or a parity data table, in which parity data of m rows×64 columns (Parity byte carried in section 0, 1, 2, . . . last FEC section) for the IP datagrams are stored. In this specification, a combination of the IP datagrams and the parity data of m rows×64 columns is called "IP data".

The broadcast station 200 performs RS (255, 191, 64) coding within the range of the application data table of 191 columns and the RS data table of 64 columns, to generate 64-column parity data. After generating the parity data of m rows×64 columns, the broadcast station 200 can decide whether or not to transmit the parity data. A process of omitting part of the generated parity data of 64 columns in transmission is called "puncturing".

FIG. 5 shows how the plurality of IP datagrams included in the IP data are stored in the application data table. As shown in FIG. 5A, byte data which constitutes a first IP datagram (1st IP datagram) at the beginning of the plurality of IP datagrams is stored from the top to bottom of a leftmost column of the application data table. Once the leftmost column has become full, the rest of the byte data of the first IP datagram (1st IP datagram Cont.) is stored from the top to bottom of a second leftmost column. After the storage of the 1st IP datagram has been completed, byte data which constitutes a next IP datagram (2nd IP datagram) is stored from the top to bottom of a remaining part of the second leftmost column, as shown in FIG. 5B. Once the second leftmost column has become full, the rest of the byte data of the next IP datagram (2nd IP datagram Cont.) is stored from the top to bottom of a third leftmost column of the application data table. This operation is repeated. until a last IP datagram (Last IP datagram) of the IP data is stored (FIG. 5C).

In this way, the IP datagrams included in the IP data are stored in the application data table of m rows×191 columns from the top of the leftmost column, with no gap therebetween. When the IP datagrams are stored in the application data table without any gap, a blank space is left in a latter part of the application data table. A fixed value (usually "00Hex") is inserted in this blank space as padding bytes, as shown in FIG. 5D.

FIG. 6 shows a procedure of generating the RS data table.

Figure 6A:
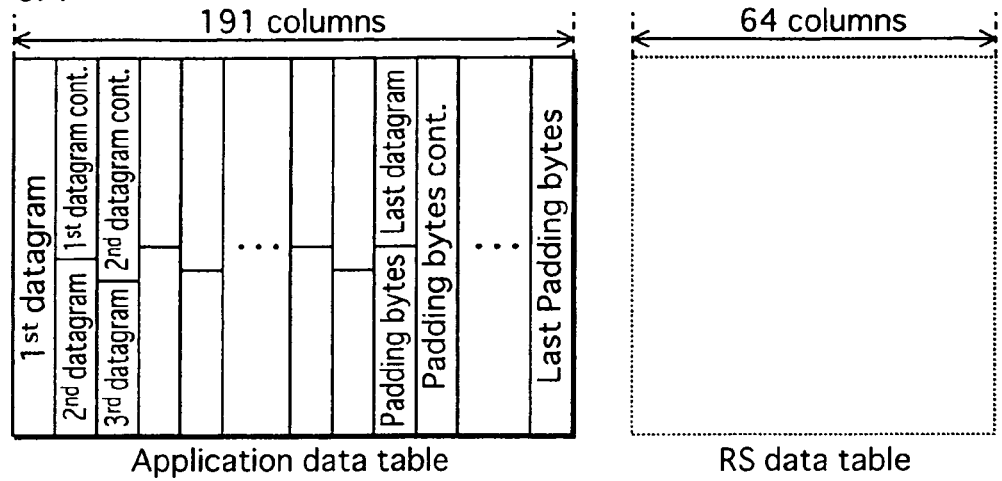
FIG. 6 shows a procedure of generating an RS data table.
Figure 6B:
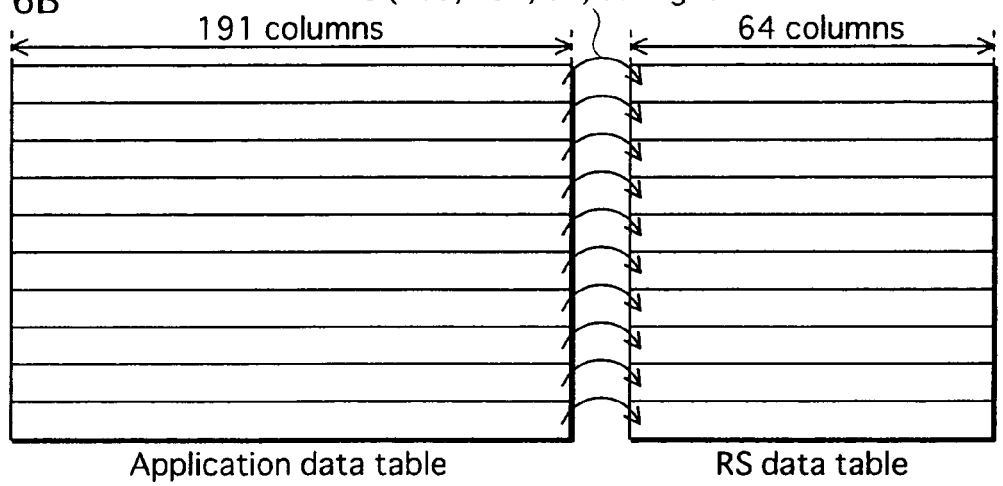
Figure 6C:
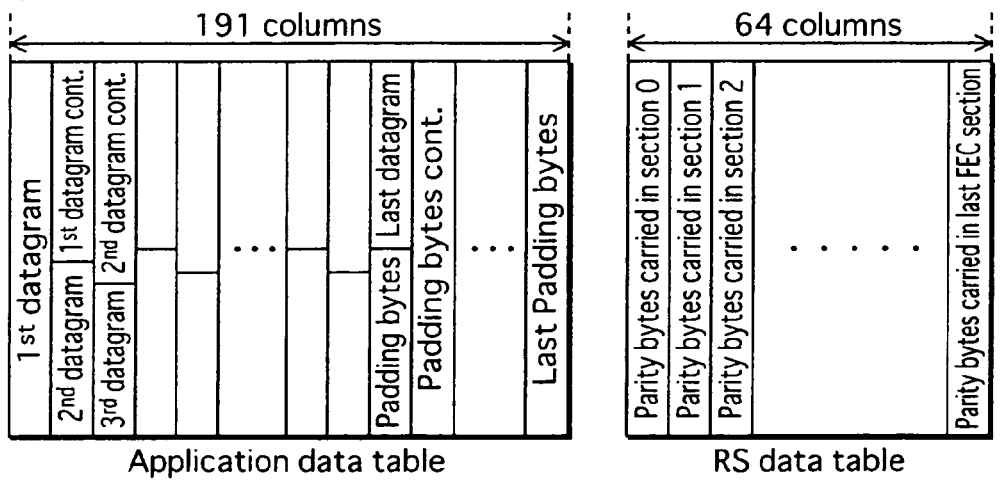

After filling the entire application data table, RS (255, 191, 64) coding is performed on each row (made up of 191 bytes) of the application data table to obtain 64-byte parity data corresponding-to that row, as shown in FIG. 6A. As a result of performing the RS (255, 191, 64) coding for each row of the application data table, m sets of 64-byte parity data are obtained (FIG. 6B). Suppose 64-byte parity data forms one row of the RS data table. Then the RS data table of m rows×64 columns is obtained (FIG. 6C).

Figure 7:
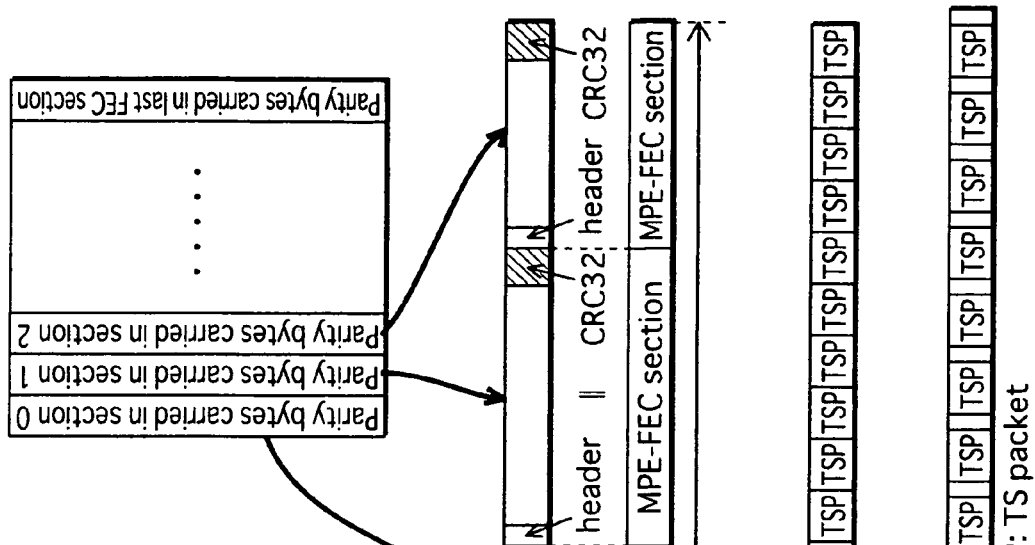
FIG. 7 shows how the application data table and the RS data table are transmitted.

FIG. 7 shows how the application data table and the RS data table are transmitted. The first level shows the application data table and the RS data table. As shown on the second level, each IP datagram in the application data table is encapsulated by adding a header to the beginning of the IP datagram and CRC-32 (32-byte cyclic redundancy code) to the end of the IP datagram. As a result, MPE sections are generated. Likewise, each column of the RS data table is encapsulated by adding a header to the beginning of the column and CRC-32 (32-byte cyclic redundancy code) to the end of the column. As a result, MPE-FEC sections are generated. The header of each section contains time information ΔT which indicates a time from the start of reception of the section to the beginning of a next burst. Also, the header of each MPE-FEC section contains information which indicates a number of columns of padding bytes used when generating the application data table.

Here, punctured data strings among the padding bytes in the application data table and the parity data in the RS data table are not subjected to transmission.

The MPE sections and MPE-FEC sections generated in the above way are converted to TS packets as shown on the third level. TS headers are added to the TS packets, RS (204, 188, 16) coding is performed on the TS packets, and then DVB-H modulation is applied to the TS packets, as shown on the fourth level. The outcome is transmitted from the broadcast station 200 to the receiving device 100. Here, data corresponding to one MPE-FEC frame is transmitted as one burst. In the following explanation, it is assumed that an MPE-FEC frame to be transmitted has no padding bytes and no punctured data.

Thus, according to DVB-H, a first part of a burst carries data, and a latter part of the burst carries parity. In a first embodiment of the present invention, this property of DVB-H is used to reduce power consumption.

Figure 8:
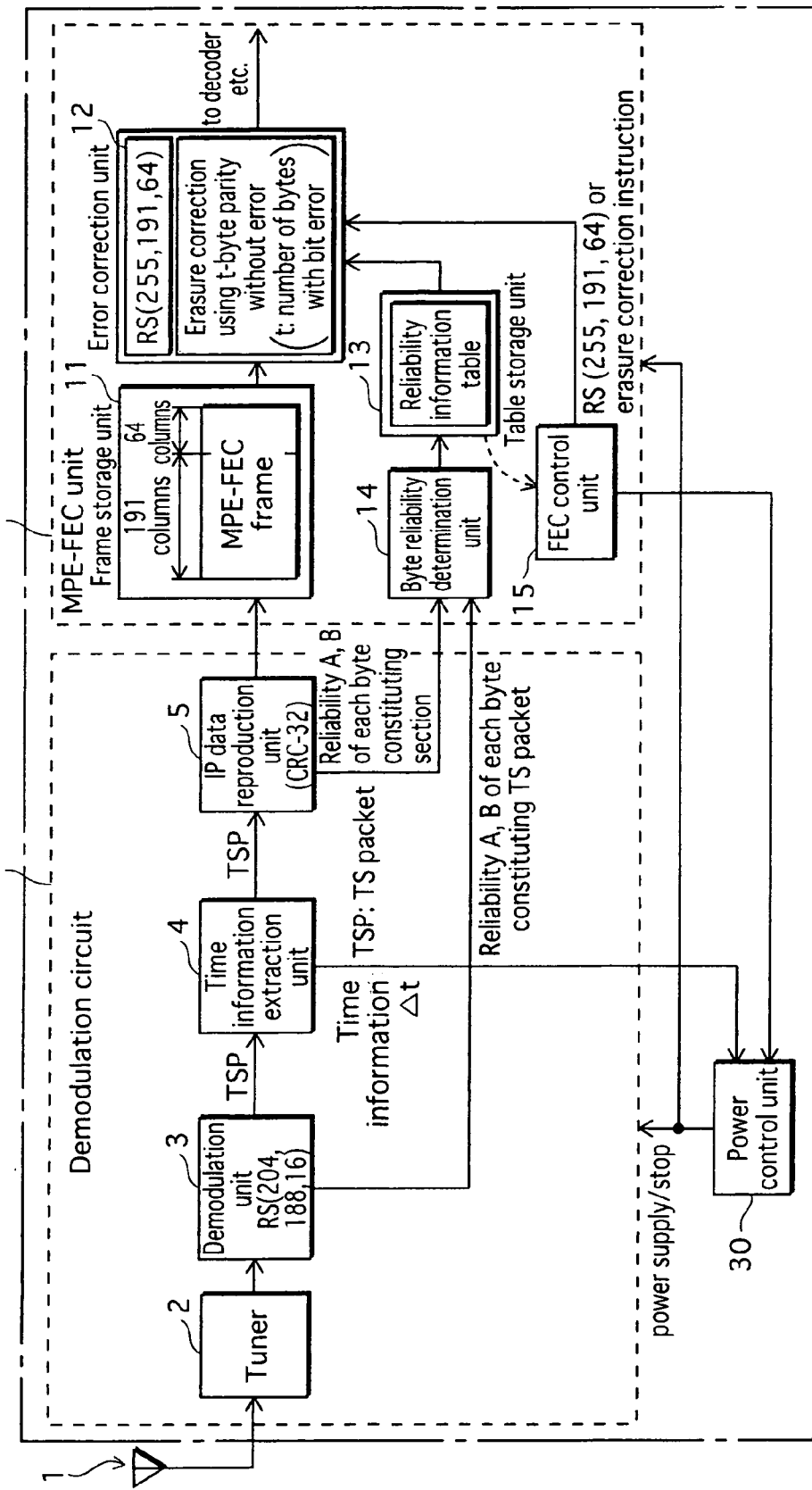
FIG. 8 shows an internal construction of a receiving device to which a first embodiment of the present invention relates.

FIG. 8 shows an internal construction of a receiving device to which the first embodiment relates. In the drawing, the receiving device includes three construction elements that are a demodulation circuit 10, an MPE-FEC unit 20, and a power control unit 30.

<Internal Construction of the Demodulation Circuit 10>

An internal construction of the demodulation circuit 10 is explained first. The demodulation circuit 10 is an integrated circuit including an antenna 1, a tuner 2, a demodulation unit 3, a time information extraction unit 4, and an IP data reproduction unit 5. Upon receiving power from an internal battery of the receiving device, the demodulation circuit 10 performs reception of a DVB-H broadcast signal and outputs MPE sections and MPE-FEC sections. The power supply to the demodulation circuit 10 starts when a burst begins, and ends when the power control unit 30 determines to stop the power supply. In this embodiment, a state where power is supplied to the power control unit 30 but not to the demodulation circuit 10 is called a "power saving mode".

The antenna 1 receives the DVB-H broadcast signal, and outputs the received signal to the tuner 2.

The tuner 2 selects a desired channel for reception at the antenna 1, and converts a signal of the selected channel to an intermediate frequency signal.

The demodulation unit 3 converts the intermediate frequency signal output from the tuner 2 to digital data using an A/D converter, and then converts the digital data to an OFDM baseband signal by orthogonal demodulation. This OFDM baseband signal is a time domain signal. The demodulation unit 3 further converts the baseband signal which is the time domain signal, to a frequency domain signal by FFT (Fast Fourier Transform). At the time of this conversion, a clock and other synchronous information are reproduced. The baseband signal converted into the frequency domain signal undergoes transmission line equalization. After this, the demodulation unit 3 performs error correction, such as Viterbi decoding and RS (204, 188, 16) decoding, on the frequency domain signal. The demodulation unit 3 outputs a TS packet obtained in this way, to the time information extraction unit 4. The time information extraction unit 3 passes the TS packet to the IP data reproduction unit 5. The demodulation unit 3 also notifies the byte reliability determination unit 14 whether a byte error in the TS packet has been completely corrected or not as a result of the RS decoding.

The time information extraction unit 4 extracts time information AT which indicates a time to the beginning of a next burst, from a header of an MPE section or an MPE-FEC section. The time information extraction unit 4 outputs the extracted time information AT to the power control unit 30.

The IP data reproduction unit 5 decapsulates a plurality of TS packets passed from the time information extraction unit 4. The decapsulation is an operation of reproducing an IP datagram from TS packets which constitute an MPE section and reproducing a parity data column from TS packets which constitute an MPE-FEC section. The IP data reproduction unit 5 inputs the reproduced IP datagram to the MPE-FEC unit 20. Upon this decapsulation, the IP data reproduction unit 5 performs error detection using CRC-32 for each section, and notifies the byte reliability determination unit 14 whether an error exists in the section.

<Internal Construction of the MPE-FEC Unit 20>

This completes the explanation on the internal construction of the demodulation circuit 10. An internal construction of the MPE-FEC unit 20 is explained next.

The MPE-FEC unit 20 is an integrated circuit including a frame storage unit 11, an error correction unit 12, a reliability information table storage unit 13, the byte reliability determination unit 14, and an FEC control unit 15. Upon receiving power from the internal battery of the receiving device, the MPE-FEC unit 20 performs error correction and outputs IP datagrams. The power supply to the MPE-FEC unit 20 starts when a burst begins, and ends when the error correction unit 12 completes error correction.

The frame storage unit 11 stores MPE sections and MPE-FEC sections output from the IP data reproduction unit 5, to reconstruct an MPE-FEC frame.

The error correction unit 12 performs RS (255, 191, 64) decoding on the MPE-FEC frame obtained in the frame storage unit 11, in units of rows. Also, the error correction unit 12 performs erasure correction under a predetermined condition. The erasure correction referred to here is an operation of, in a case where a position of each byte having a bit error is detectable when receiving the application data table, correcting the bytes having bit errors by using a same number of parity bytes as the bytes having bit errors.

Parity data of 64 columns is added to the rows of the application data table in a horizontal direction. If, in each row, no bit error exists in the same number of parity bytes as the bytes having bit errors among the 64-column parity data, the bytes having bit errors are correctable.

Which is to say, if 191 (=255−64) bytes out of the 255 bytes which combine the byte data and the parity data of each row of the MPE-FEC frame are recognized to have no bit error, the bytes having bit errors can be corrected by erasure correction.

The reliability information table storage unit 13 is a memory for storing a reliability information table. The reliability information table is made up of flags of m rows×255 columns. Each flag corresponds to a different byte or parity byte in m rows×255 columns of the MPE-FEC frame. When the flag is ON, it indicates that the corresponding byte or parity byte may have a bit error. When the flag is OFF, it indicates that the corresponding byte or parity byte does not have a bit error. In detail, each flag in the reliability information table shows whether the corresponding byte or parity byte has reliability A (with no bit error) or reliability B (with a bit error), by indicating whether the corresponding byte or parity byte may have a bit error or not. Let x be any number from 1 to m, and y be any number from 1 to 255. Then a flag at an xth row and a yth column in the reliability information table indicates whether a byte or parity byte at an xth row and a yth column in the MPE-FEC frame may have a bit error or not.

The byte reliability determination unit 14 determines reliability of each byte of the MPE-FEC frame, based on packet-wise reliability obtained as a result of performing error correction using RS (204, 188, 16) on each TS packet and notified from the demodulation unit 3, and section-wise reliability obtained as a result of performing error detection using CRC-32 on each section and notified from the IP data reproduction unit 5. The byte reliability determination unit 14 generates the reliability information table in the reliability information table storage unit 13 in accordance with the determination.

The FEC control unit 15 determines whether at least 191 bytes have no bit error in each row of the application data table. If a bit error is found in the 191 columns of the application data table, the FEC control unit 15 performs RS (255, 191, 64) or erasure correction. If no bit error is found in the 191-columns of the application data table, the FEC control unit 15 determines that no error correction is necessary. If the number of bytes with no bit error is less than 191 in each row of the MPE-FEC frame, the FEC control unit 15 determines that error correction is impossible. In other words, error correction is possible if, in each row, at least 191 columns have no bit error among the 255 columns with reference to the reliability information table which relates to not only the application data table but also the RS data table. Even when 190 bytes in each row of the application data table have no bit error, error correction is impossible if all 64 bytes in the row of the RS data table have a bit error.

<Power Control Unit 30>

The power control unit 30 controls the power supply to the demodulation circuit 10 and the MPE-FEC unit 20, based on the determination by the byte reliability determination unit 14 and the time information ΔT. The power control unit 30 calculates a time at which a next burst begins from the time information ΔT, and calculates a receiving start time of the next burst in consideration of a synchronization time and the like. The power control unit 30 starts the power supply to the demodulation circuit 10 and the MPE-FEC circuit 20 based on this receiving start time. The power control unit 30 decides to stop the power supply to the demodulation circuit 10, when the byte reliability determination unit 14 determines that at least 191 bytes have reliability A in each row of the MPE-FEC frame.

<Receiving Operation>

Figure 9:
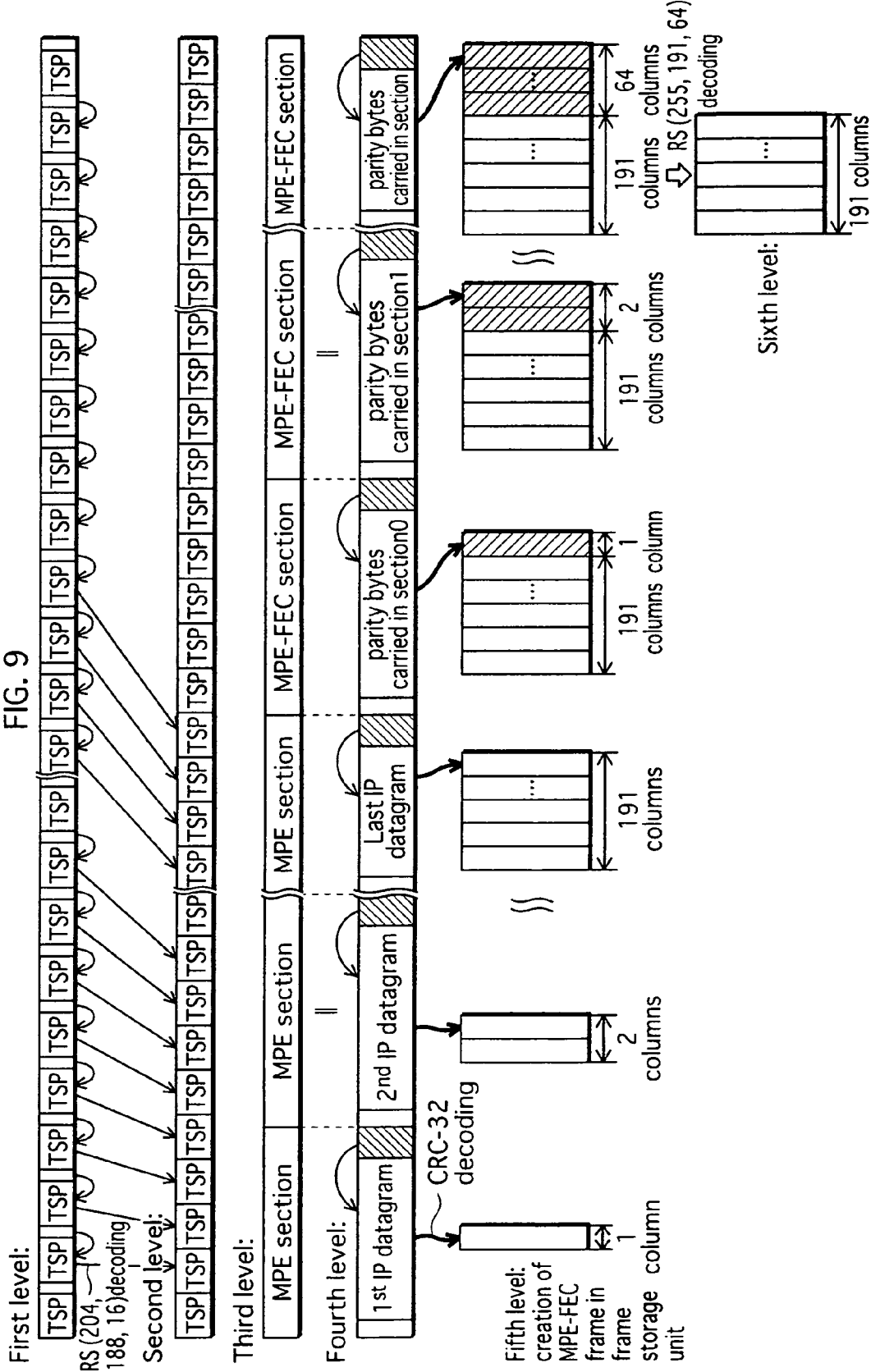
FIG. 9 shows a receiving operation by the receiving device 100.

FIG. 9 shows a receiving operation performed by the receiving device 100. The first level shows TS packets (each of which is 204 bytes long) after Viterbi decoding by the demodulation unit 3. The second level shows a result of error correction using RS (204, 188, 16). As a result of this error correction using RS (204, 188, 16) by the demodulation unit 3, TS packets (each of which is 188 bytes long) are obtained.

The third level shows MPE sections and MPE-FEC sections after converting the TS packets in units of sections. The fourth level shows internal structures of the MPE sections and MPE-FEC sections. Each of the MPE sections and MPE-FEC sections contains a header and CRC-32. The IP data reproduction unit 5 removes the header from each section, and performs error detection using CRC-32. As a result of the IP data reproduction unit 5 performing this operation on each of the MPE sections and MPE-FEC sections sequentially input therein, all IP datagrams of the application data table and one column of the RS data table at a time are obtained on a memory, as shown on the fifth level. Here, the value "00Hex" is assigned to each padding byte, and an appropriate value is assigned to each punctured byte.

After obtaining the application data table and the RS data table of the MPE-FEC frame, error correction using RS (255, 191, 64) is performed based on the RS data table of the MPE-FEC frame, as a result of which byte data of m rows× 191 columns is obtained as shown on the sixth level.

The following explains what kind of criterion is used to determine reliability of each byte by the byte reliability determination unit 14.

<Details of Erasure Correction>

Figure 10:
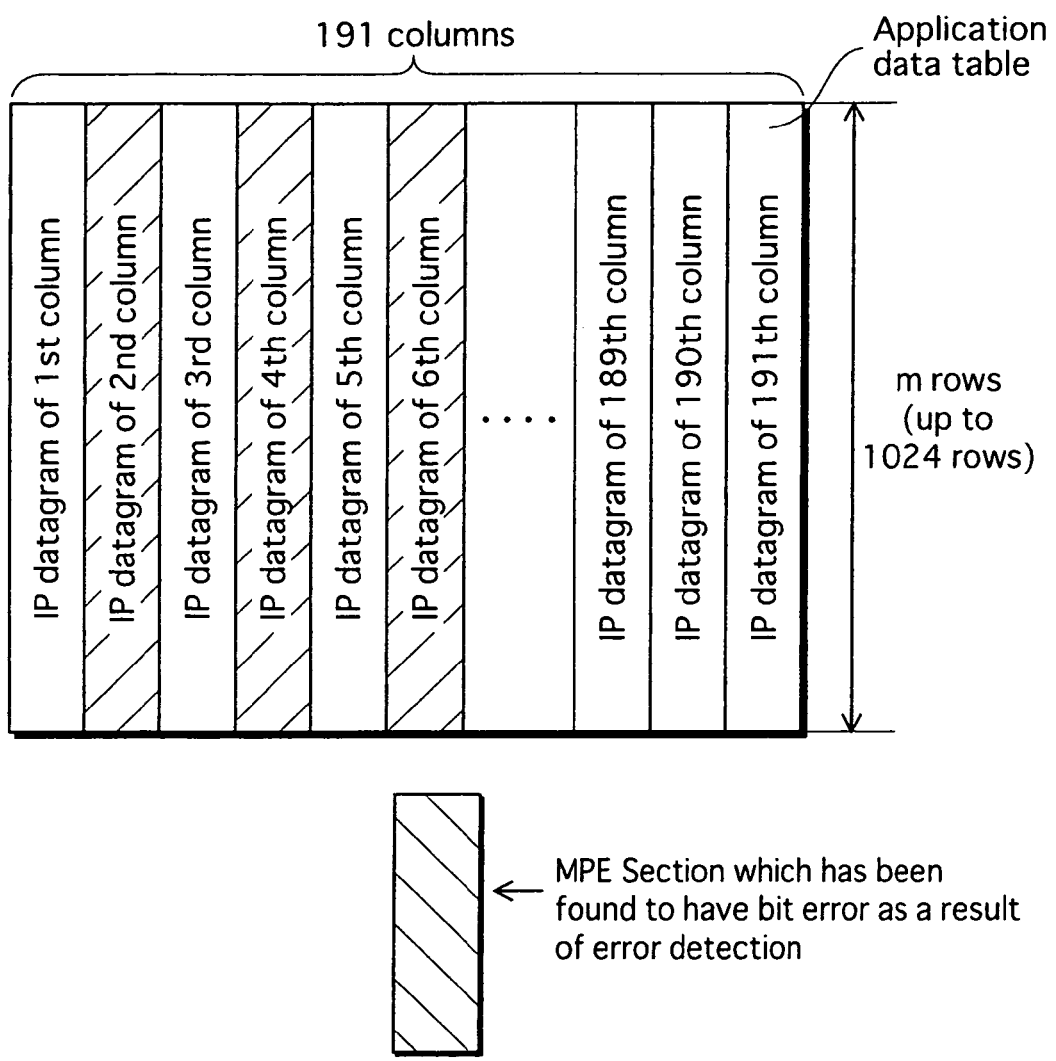
FIG. 10 shows an application data table which is subjected to erasure correction.
Figure 11:
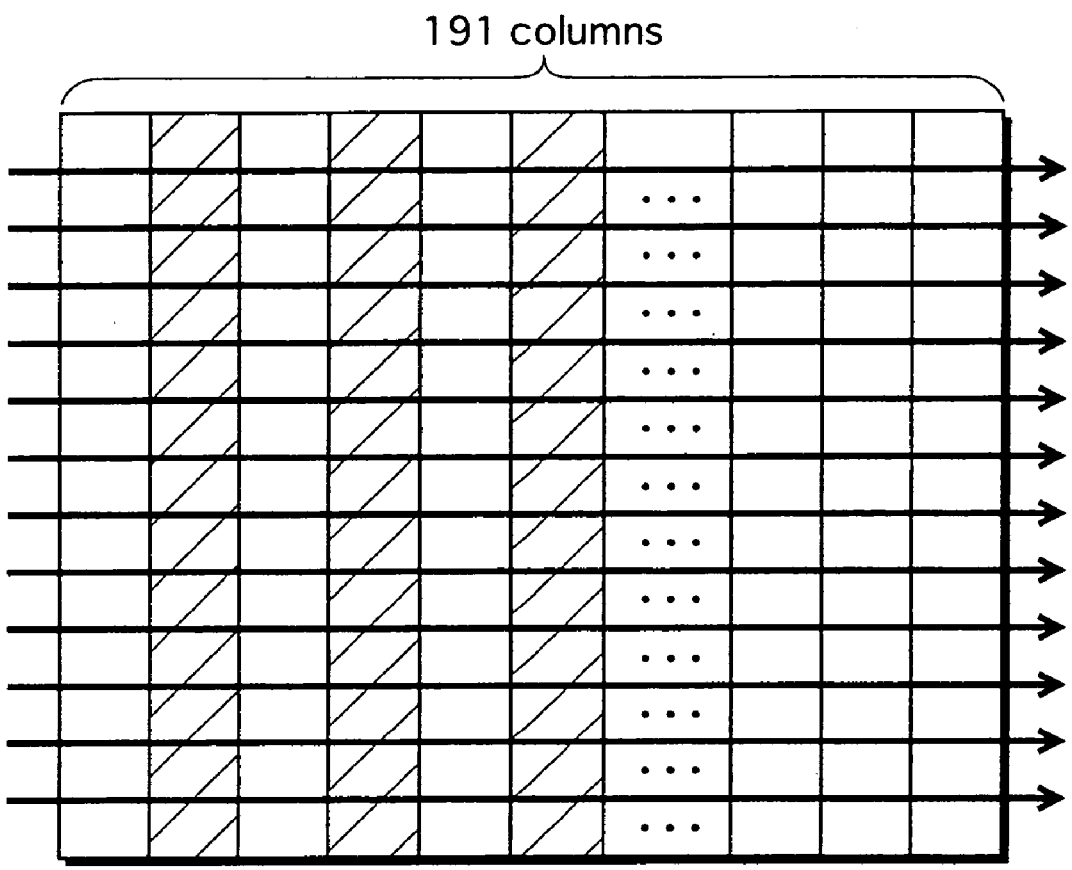
FIG. 11 shows how erasure correction is performed on the application data table shown in FIG. 10.
Figure 12:
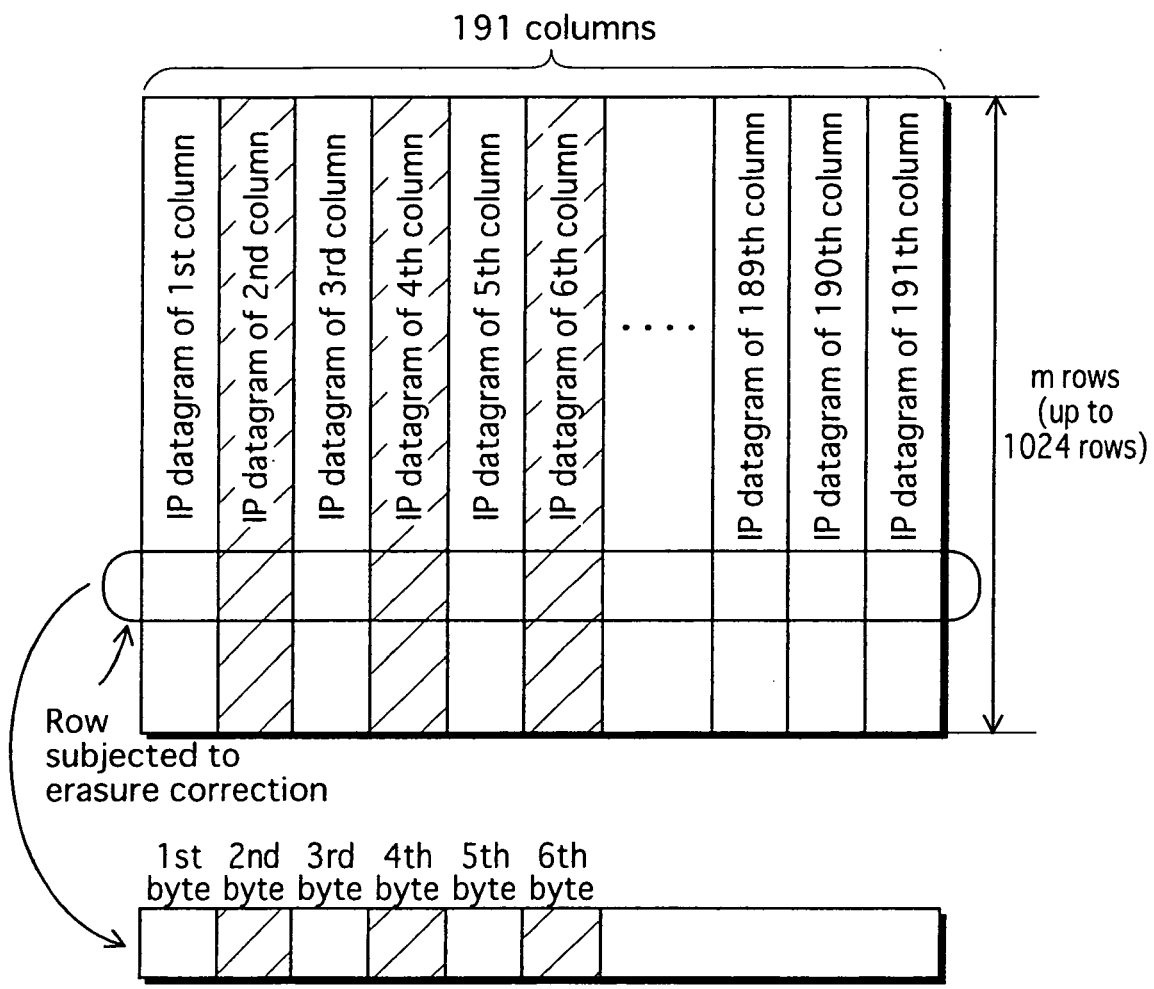
FIG. 12 shows a structure of a 191-byte row which is subjected to erasure correction.

The following explains how erasure correction for RS decoding is carried out, with reference to FIGS. 10 to 12.

FIG. 10 shows an application data table which is subjected to erasure correction.

In the drawing, hatching indicates that bit errors in MPE sections of second, fourth, and sixth columns cannot be corrected by the packet-wise error correction by the demodulation unit 3 and the section-wise error detection using CRC-32 by the IP data reproduction unit 5, and so the bit errors still exist in the MPE sections of the second, fourth, and sixth columns (it should be noted here that MPE sections are not arranged in units of columns).

FIG. 11 shows how erasure correction is performed on the application data table shown in FIG. 10. In the drawing, horizontal arrows indicate that erasure correction is performed on each row (191-byte data) of the application data table.

FIG. 12 shows a structure of a 191-byte row that is subjected to erasure correction. Suppose an encircled row (191-byte data) in the drawing is subjected to erasure correction. Since the second, fourth, and sixth columns of the application data table have bit errors as shown in FIG. 10, it can be recognized that the second, fourth, and sixth bytes of the 191 bytes which constitute the row have bit errors. Accordingly, if the same number of bytes as those having the bit errors are added to the application data table in the horizontal direction, the bit errors in this row can be corrected by erasure correction. By repeating such erasure correction for all of the rows of the application data table, the bit errors in the application data table can be corrected without using the whole RS data table.

<Relationship between the Error Correction Result and the Reliability Determination>

As described above, erasure correction is based on a premise that determination as to whether a bit error exists or not in each of the MPE sections and MPE-FEC sections can be made correctly. The following explains how to determine whether a bit error exists or not, that is, how to determine reliability of each byte, in detail.

Figures 13A, 13B:
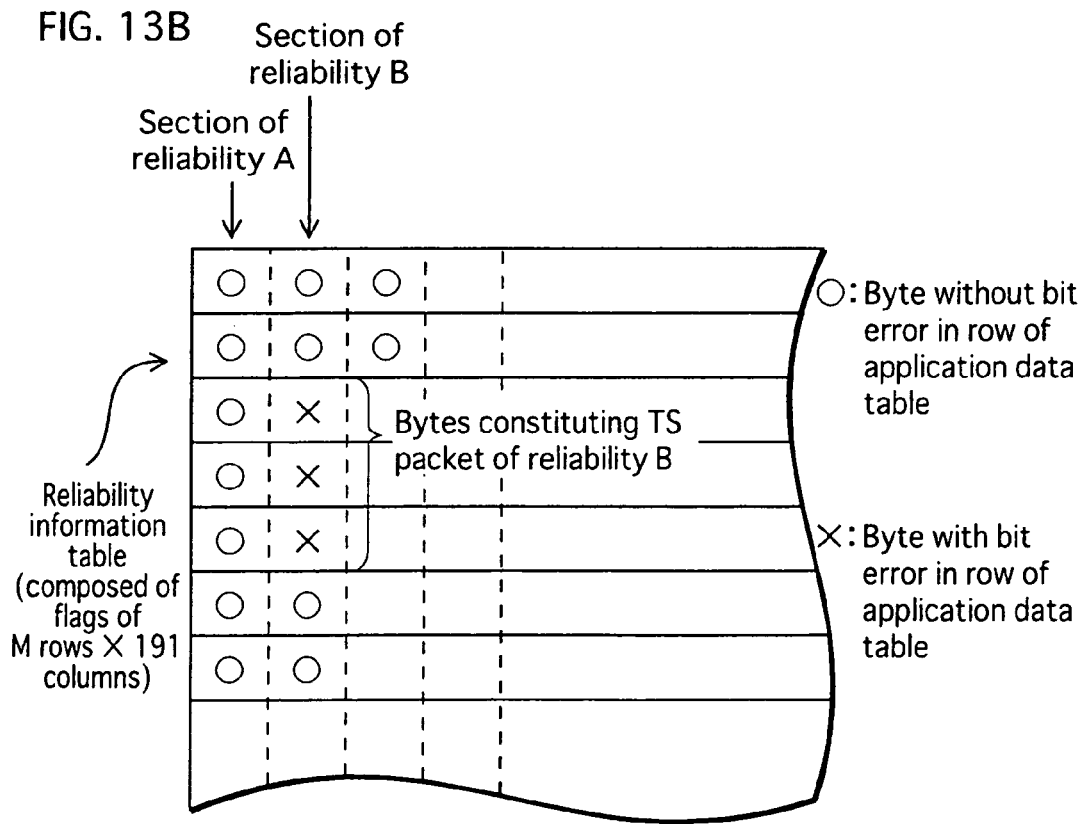
FIG. 13A shows how a byte reliability determination unit 14 determines reliability according to a combination of a result of error detection on an MPE section or an MPE-FEC section using CRC-32 and a result of error correction on TS packets constituting the section using RS (204, 188, 16).
FIG. 13B shows how flags of a reliability information table are set as a result of the determination by the byte reliability determination unit 14.

FIG. 13A shows what kind of determination is made by the byte reliability determination unit 14 in accordance with a combination of a result of error detection using CRC-32 on a section to which one byte belongs and a result of error correction using RS (204, 188, 16) on a TS packet to which the byte belongs.

If the result of error detection using CRC-32 of the section to which the byte belongs is reliability A and the result of error correction using RS (204, 188, 16) of the TS packet to which the byte belongs is reliability A, the byte is determined to have reliability A.

If the result of error detection using CRC-32 of the section to which the byte belongs is reliability B but the result of error correction using RS (204, 188, 16) of the TS packet to which the byte belongs is reliability A, the byte is determined to have reliability A.

If the result of error detection using CRC-32 of the section to which the byte belongs is reliability A but the result of error correction using RS (204, 188, 16) of the TS packet to which the byte belongs is reliability B, the byte is determined to have reliability A.

On the other hand, if the result of error detection using CRC-32 of the section to which the byte belongs is reliability B and the result of error correction using RS (204, 188, 16) of the TS packet to which the byte belongs is reliability B, the byte is determined to have reliability B.

Thus, if no error is detected in the result of error detection using CRC-32 of the section or the result of error correction using RS (204, 188, 16) of the TS packet, the byte is determined to have reliability A.

<Flag Setting according to the Reliability Determination>

FIG. 13B shows how the flags of the reliability information table are set according to the determination result of the byte reliability determination unit 14. When one byte is determined to have reliability A as a result of the determination shown in FIG. 13A, a flag in the reliability information table corresponding to that byte is set to reliability A. The mark o in FIG. 13B indicates that a corresponding byte has reliability A.

<Process of Updating the Reliability Information Table>

A process of updating the reliability information table as a result of reception of MPE-FEC sections is explained below.

Figure 14A:
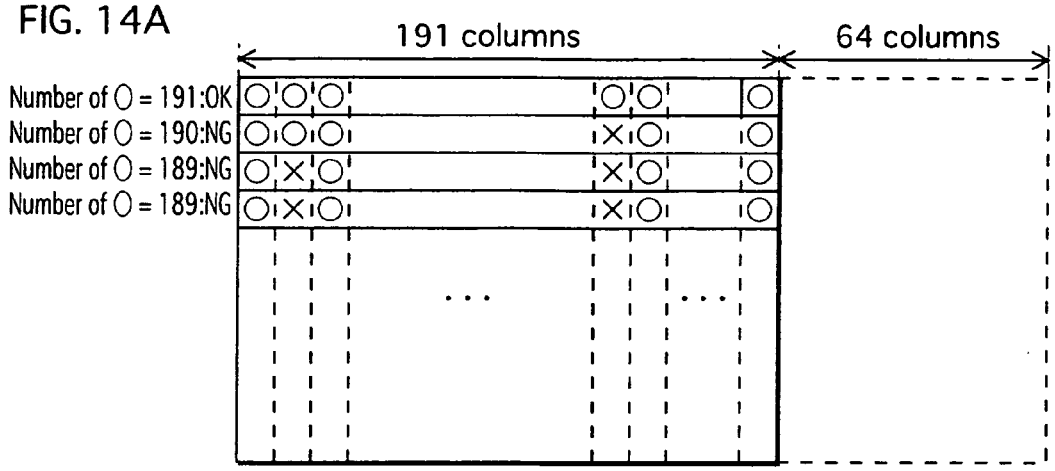
FIGS. 14A to 14C show a process of updating the reliability information table.
Figure 14B:
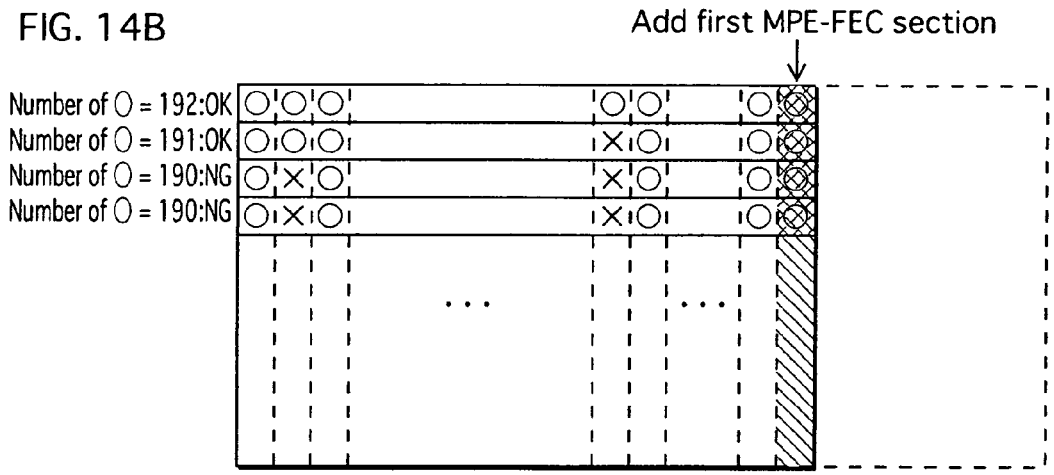
Figure 14C:
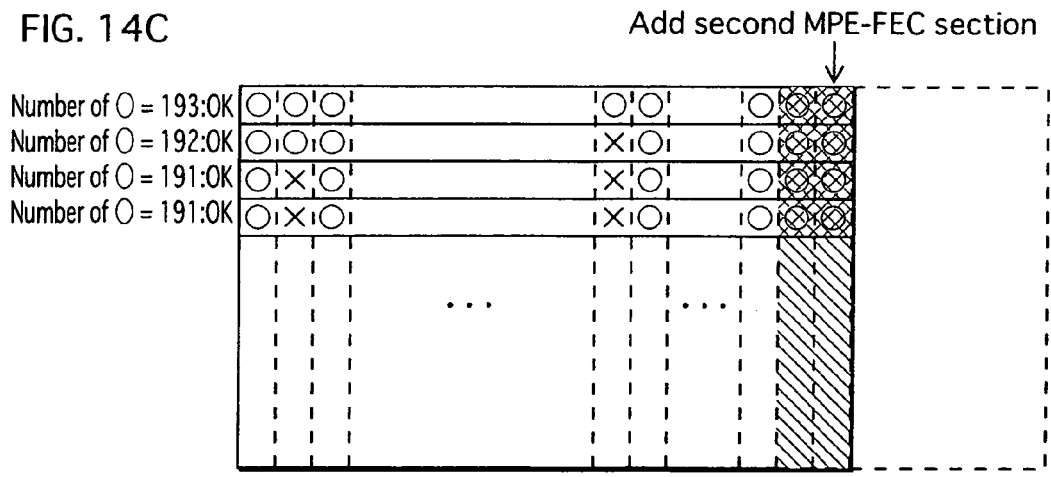

In FIGS. 14A to 14C, the notes given on the left side indicate how many ○ flags (i.e. how many bytes of reliability A) are present in each of the first to fourth rows of the application data table. FIG. 14A concerns a stage where all IP datagrams of the application data table are reproduced. As can be seen from the drawing, the first row has 191 bytes of reliability A, the second row has 190 bytes of reliability A, and the third and fourth rows each have 189 bytes of reliability A.

FIG. 14B shows how the reliability information table is updated as a result of adding a first MPE-FEC section. When the MPE-FEC section which forms parity data added to the MPE-FEC frame has reliability A, the numbers of bytes of reliability A in the first to fourth rows have increased by 1, respectively to 192, 191, 190, and 190 as indicated by the notes given on the left side.

FIG. 14C shows how the reliability information table is updated as a result of adding a second MPE-FEC section. When the MPE-FEC section which forms parity data added to the MPE-FEC frame has reliability A, the numbers of bytes of reliability A in the first to fourth rows have increased by 1, respectively to 193, 192, 191, and 191 as indicated by the notes given on the left side.

Figure 15A:
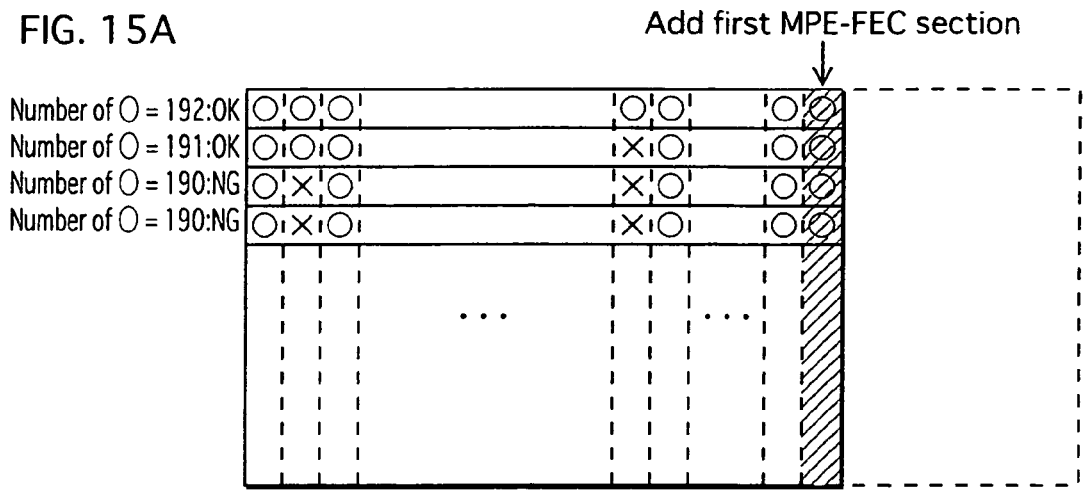
FIGS. 15A to 15C show a process of updating the reliability information table.
Figure 15B:
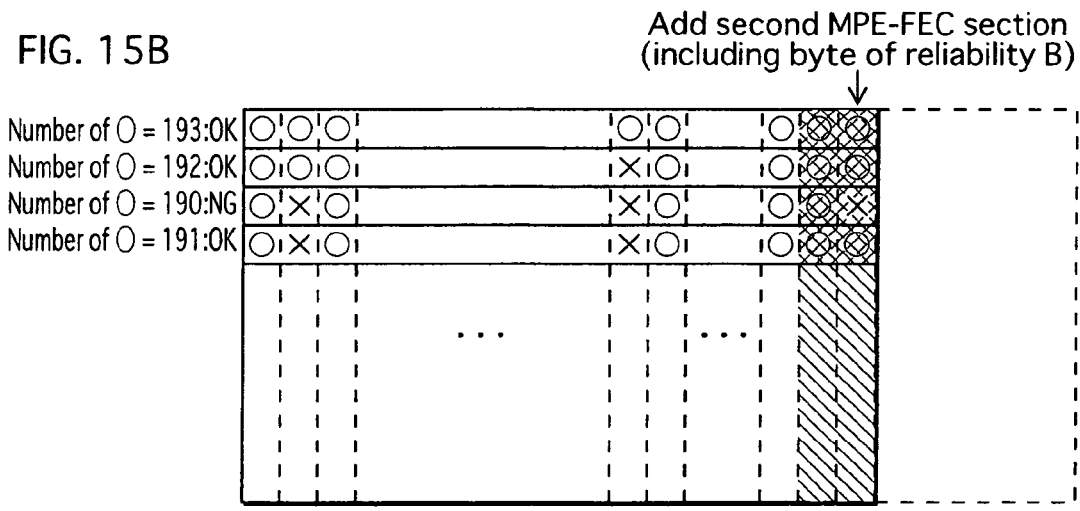
Figure 15C:
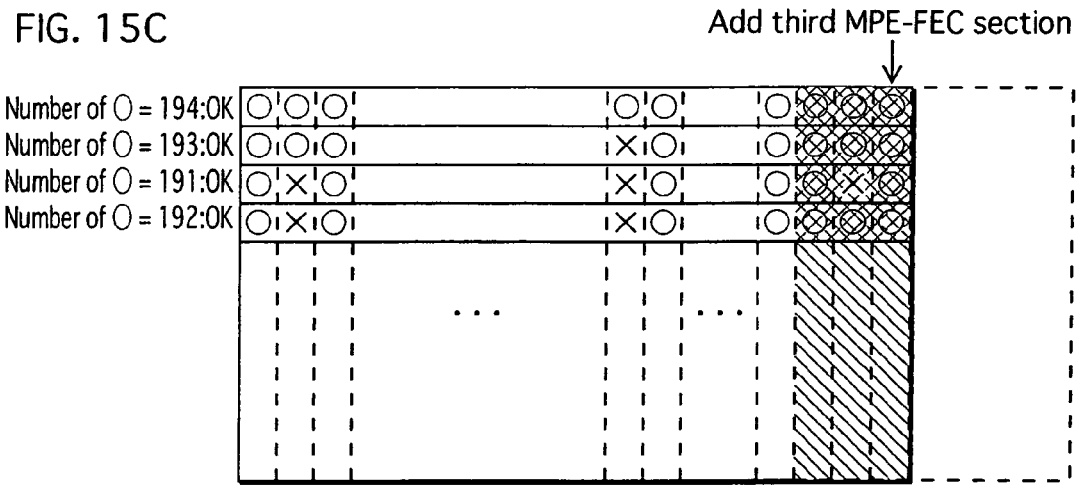

FIGS. 14A to 14C show an example of adding an MPE-FEC section whose bytes all have reliability A. FIGS. 15A to 15C show an example of adding an MPE-FEC section including byte data of reliability B.

FIG. 15A is identical to FIG. 14B. That is, the numbers of bytes of reliability A in the first to fourth rows are respectively 192, 191, 190, and 190.

FIG. 15B shows how the reliability information table is updated as a result of adding a second MPE-FEC section. When the MPE-FEC section added to the application data table contains a byte of reliability B in the third row, the numbers of bytes of reliability A in the first to fourth rows are respectively 193, 192, 190, and 191, as indicated by the notes on the left side.

FIG. 15C shows how the reliability information table is updated as a result of adding a third MPE-FEC section. When the MPE-FEC section added to the application data table is made up of bytes which all have reliability A, the numbers of bytes of reliability A in the first to fourth rows have increased by 1, respectively to 194, 193, 191, and 192 as indicated by the notes given on the left side.

In the above processes shown in FIGS. 14 and 15, if the number of bytes of reliability A is at least 191 in each row of the MPE-FEC frame, bit errors in the MPE-FEC frame can be corrected by performing erasure correction. This makes it unnecessary to wait for receiving all of the 64 MPE-FEC sections in the second period. Hence the switching to the power saving mode can be accelerated.

Figure 16:
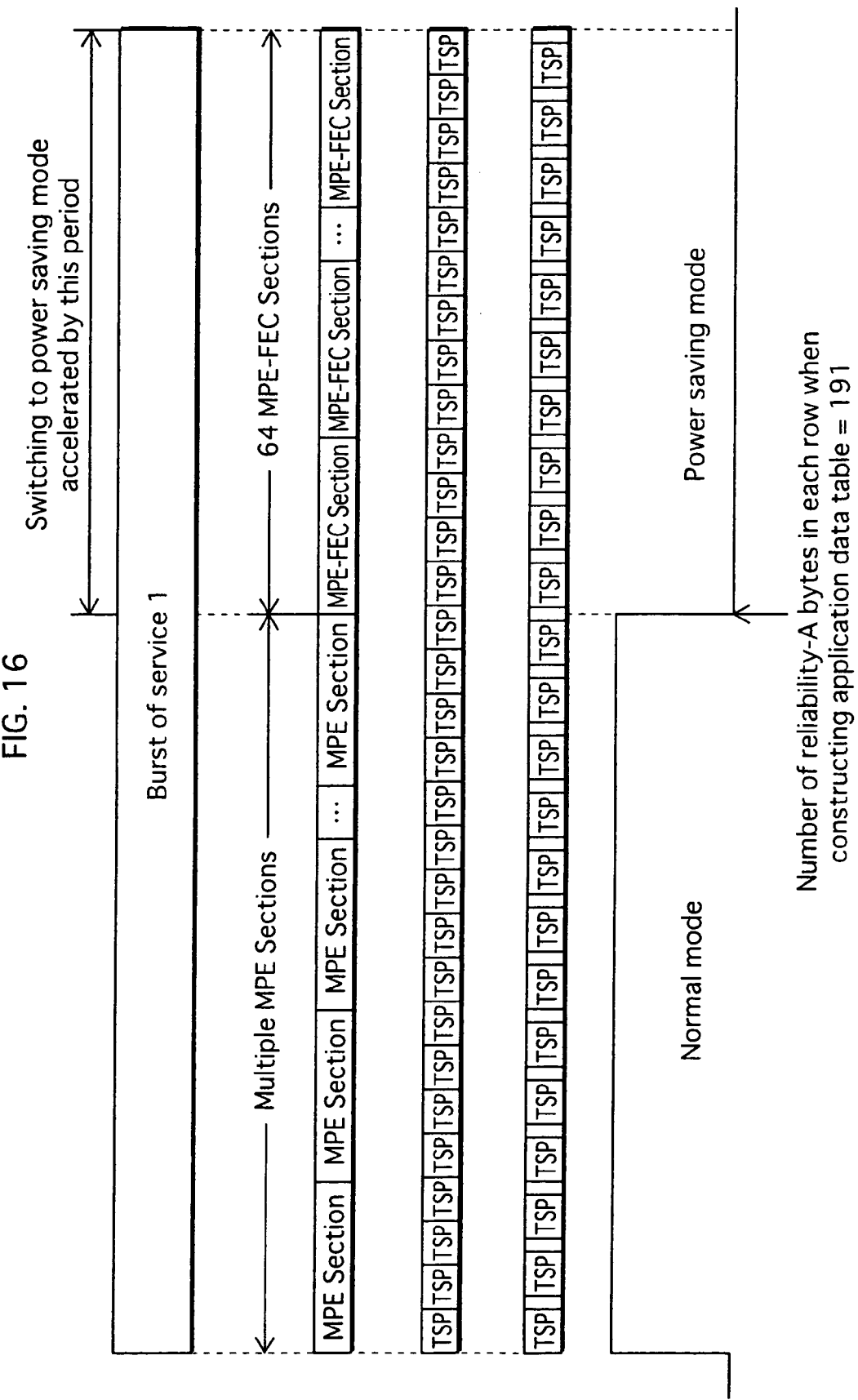
FIG. 16 shows switching to a power saving mode when at least 191 bytes of reliability A are recognized to exist in each row of the application data table.

FIG. 16 shows the switching to the power saving mode in a case where each row of the MPE-FEC frame is recognized to have at least 191 bytes of reliability A.

If this recognition of the existence of at least 191 bytes of reliability A is made before the beginning of the second period, the power control unit 30 can switch to the power saving mode before the second period begins.

Figure 17:
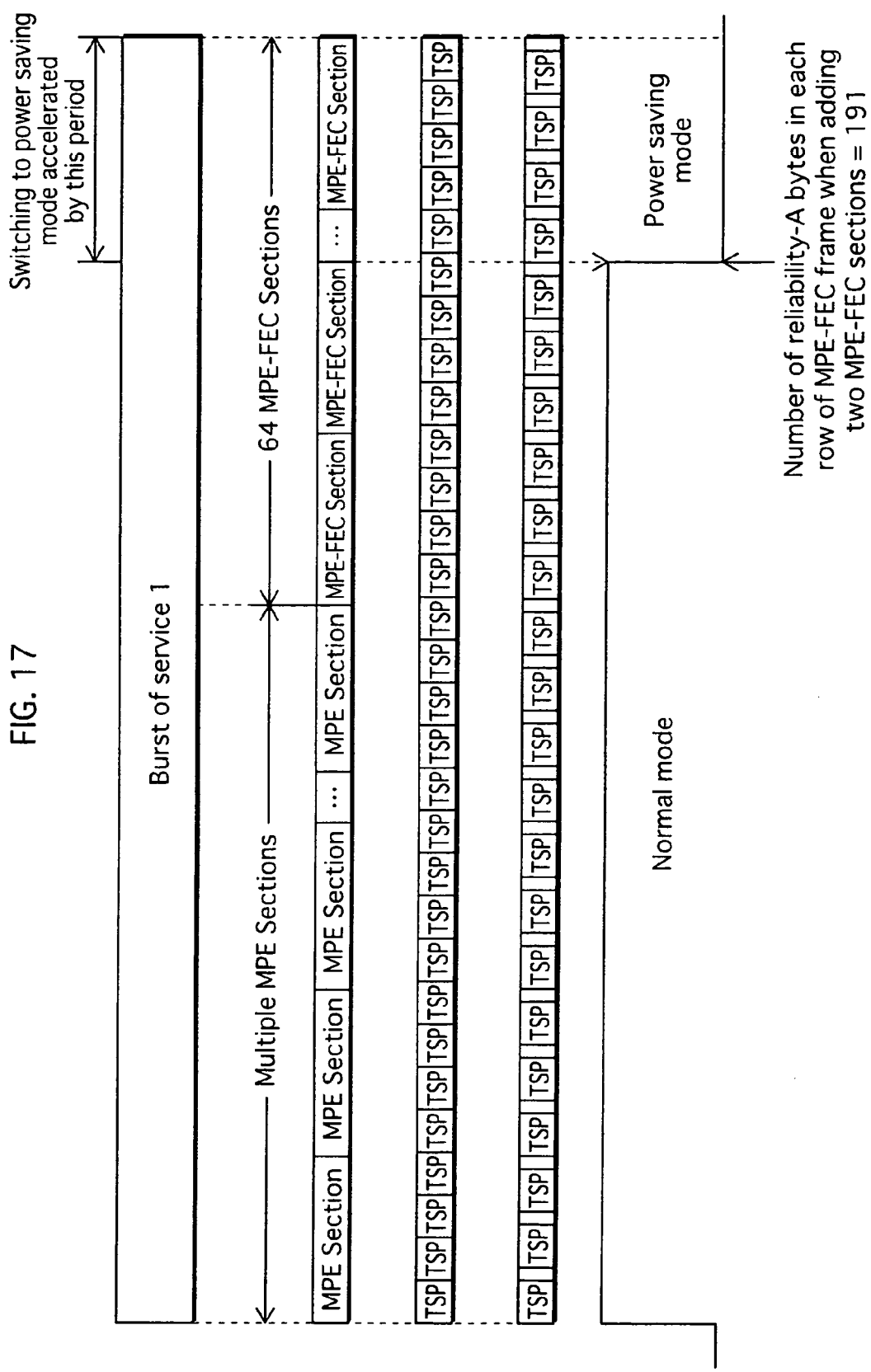
FIG. 17 shows switching to the power saving mode when at least 191 bytes of reliability A are recognized to exist in each row of the application data table.

FIG. 17 shows the switching to the power saving mode in a case where the recognition of the existence of at least 191 bytes of reliability A is made when receiving the second MPE-FEC section during the second period. If the recognition is made during the second period, the power control unit 30 can switch to the power saving mode even during the second period.

<Implementation of the FEC Control Unit 15 and the Power Control Unit 30 by Software>

Implementation of the FEC control unit 15 and the power control unit 30 by software is explained next. The FEC control unit 15 and the power control unit 30 can be implemented in the receiving device, by producing a program for a control procedure shown in a flowchart of FIG. 18 and having a CPU in the receiving device execute the program.

Figure 18:
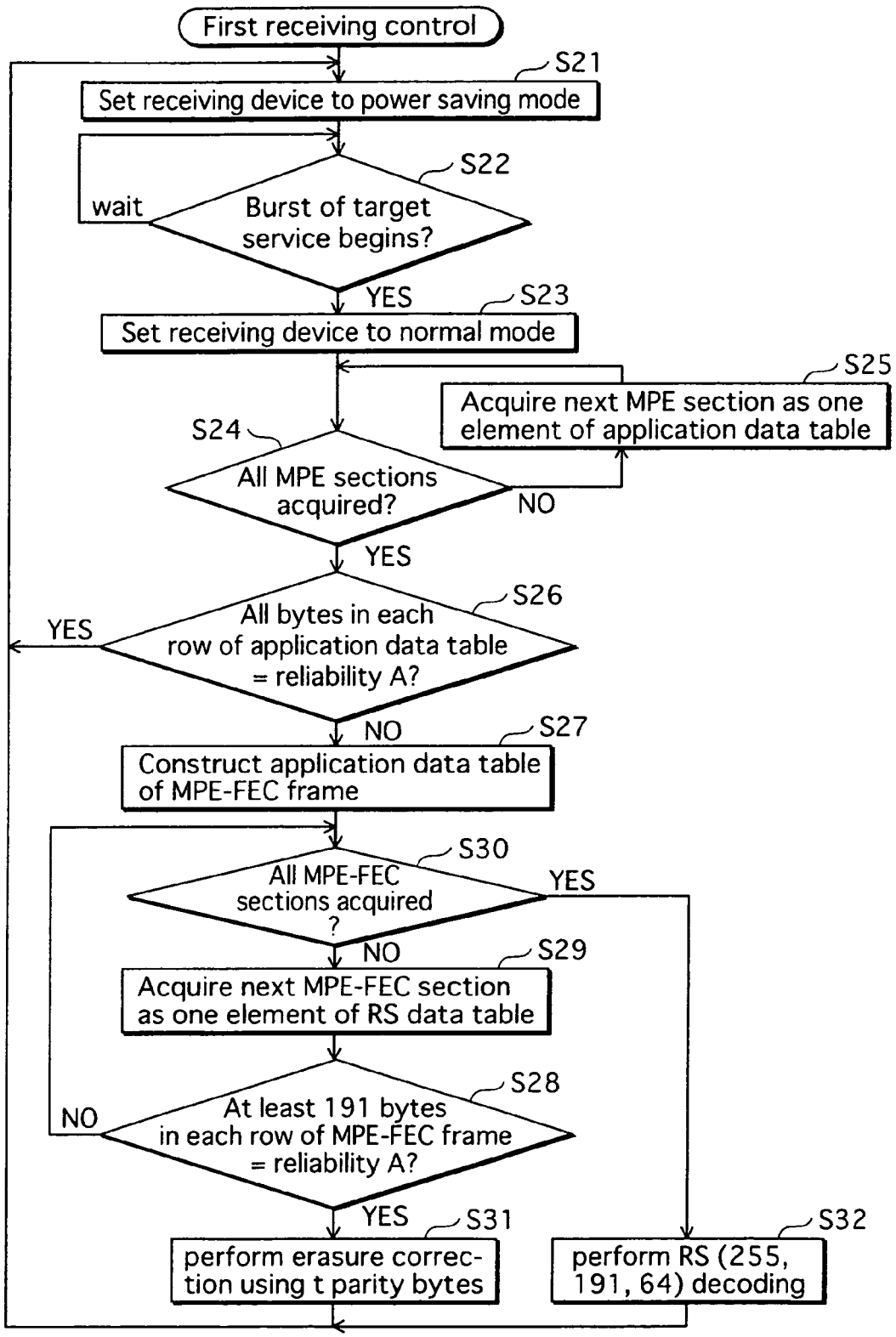
FIG. 18 is a flowchart showing a procedure of overall control of the receiving device by a FEC control unit 15 and a power control unit 30.

FIG. 18 is a flowchart showing a procedure of overall control of the receiving device by the FEC control unit 15 and the power control unit 30. In this flowchart, the following procedure is repeated. After the receiving device is set to the power saving mode (step S21), detection as to whether a burst of a target service begins is made (step S22). If the burst of the target service begins (step S22: YES), the receiving device is set to the normal mode (step S23), and steps S24 to S32 are performed before returning to step S21.

Steps S24 to S32 include a first loop made up of steps S24 and S25 and a second loop made up of step S28 to S30.

The first loop repeats a process of acquiring an MPE section and setting it as one part of or a whole column of the application data table. (step S25), until all MPE sections are acquired (step S24: YES).

Step S26 determines whether all bytes have reliability A in each row of the application data table acquired in this way. If all bytes have reliability A, the procedure returns to step S21 to switch to the power saving mode.

If any row includes a byte that does not have reliability A, the application data table is constructed (step S27), and then the second loop made up of steps S28 to S30 is performed.

The second loop repeats a process of acquiring an MPE-FEC section and setting it as a column of the RS data table (step S29), until any of steps S28 and S30 results in YES.

Step S28 determines whether at least 191 bytes have reliability A in each row of the MPE-FEC frame. If at least 191 bytes have reliability A, erasure correction is executed (step S31), and then the procedure returns to step S21 to switch to the power saving mode.

Step S30 determines whether all MPE-FEC sections of the RS data table have been acquired. If all MPE-FEC sections have been acquired, error correction using RS (255, 191, 64) is executed (step S32), and then the procedure returns to step S21 to switch to the power saving mode.

If step S28 results in YES, the receiving device is switched to the power saving mode without waiting for the reception of all MPE-FEC sections. Hence the receiving device can stay in the power saving mode in a longer duration.

Thus, according to this embodiment, the number of parity bytes to be received can be adjusted in accordance with how many bit errors occur in each row of the application data table. This being so, upon receipt of the number of parity bytes sufficient for performing erasure correction, the receiving device can be switched to the power saving mode. Since the switching to the power saving mode is accelerated in this way, the receiving device can stay in the power saving mode in a longer duration, which contributes to a longer battery life.

This effect of power consumption reduction depends on a structural ratio of the application data table and the RS data table in one burst. Suppose the application data table has 191 columns whereas the RS data table is constituted by a parity data table of 64 columns without a punctured data table. In such a case, if a receiving environment is good, a power supply period can be reduced by about 25% (=64/255) at the maximum.

Also, according to this embodiment, if bit errors can be corrected using part of the RS data table, the receiving device can be switched to the power saving mode even during the second period. Which is to say, in a case where bit errors cannot be corrected by the same error correction function as DVB-T but there is no need to perform error correction using the whole RS data table, the receiving device can be switched to the power saving mode by performing erasure correction, with there being no need to wait for the end of the second period. Since the receiving device can be switched to the power saving mode without waiting for the end of the second period, the receiving device can stay in the power saving mode in a longer duration.

It should be noted here that, depending on when the power supply to the demodulation circuit 10 is stopped, there is a possibility that one or more columns subsequent to a column at which the power supply is determined to be stopped may have already been received. Even when an extra column has been received as in this case, the receiving device can still be switched to the power saving mode without waiting for the reception of the whole RS data table. Hence the effect of power consumption reduction can still be achieved.

SECOND EMBODIMENT

Figure 19:
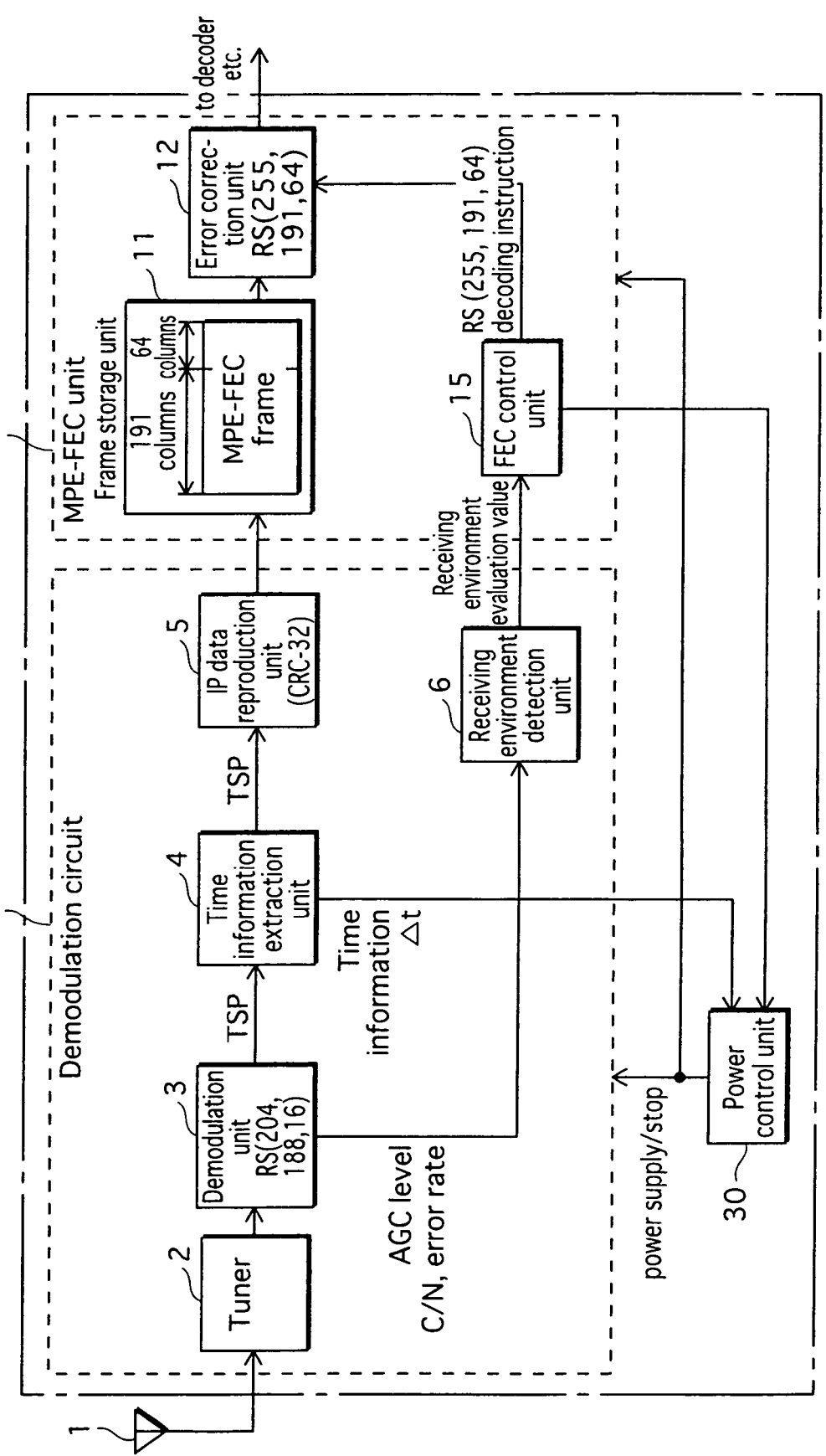
FIG. 19 shows an internal construction of a receiving device to which a second embodiment of the present invention relates.

FIG. 19 shows an internal construction of a receiving device to which a second embodiment of the present invention relates. The receiving device of the second embodiment differs from that shown in FIG. 8, in that a receiving environment detection unit 6 in the demodulation circuit 10 has been provided instead of the reliability information table storage unit 13 and the byte reliability determination unit 14.

The receiving environment detection unit 6 detects a receiving environment, and outputs a value (evaluation value) for evaluating the detected receiving environment. The output receiving environment evaluation value is input into the FEC control unit 15. In this embodiment, an AGC level, a C/N value, a received signal error rate, and a receiving device moving speed are used as such receiving environment evaluation values.

<Receiving Environment Evaluation Values>

Each of the above receiving environment evaluation values is explained below.

The AGC level is a signal level of an automatic gain control (AGC) in the demodulation unit 3. When the signal level of the AGC is below a specified value, the FEC control unit 15 judges that the receiving environment is bad.

The C/N value of a received signal is a signal power to noise power ratio of the received signal, and is calculated from a transmission path estimated from a pilot signal contained in the received signal. When the C/N value is below a specified value, the FEC control unit 15 judges that the receiving environment is bad.

The receiving device moving speed is calculated from a time variation of the transmission path estimated from the pilot signal contained in the received signal. When the receiving device moving speed is greater than a specified value, the FEC control unit 15 judges that the receiving environment is bad.

The error rate is detected as a number of errors of TS packets before and after RS decoding. When the error rate is higher, the FEC control unit 15 judges that the receiving environment is worse.

In a case where a terminal also uses a communication function such as a wireless LAN, a mobile phone, Bluetooth, or infrared communication, the receiving environment of a broadcast signal may not be good due to radio interference or the like. Accordingly, upon detecting transmission or reception by a communication function during receipt of a burst, the receiving environment is judged as being bad. Here, it is also possible to detect whether the terminal is performing communication, based on notification information from an external CPU of the terminal.

(FEC Control Unit 15, Power Control Unit 30)

This completes the explanation on the receiving environment evaluation values. The following explains a control procedure of the FEC control unit 15 and the power control unit 30 in the second embodiment.

Figure 20:
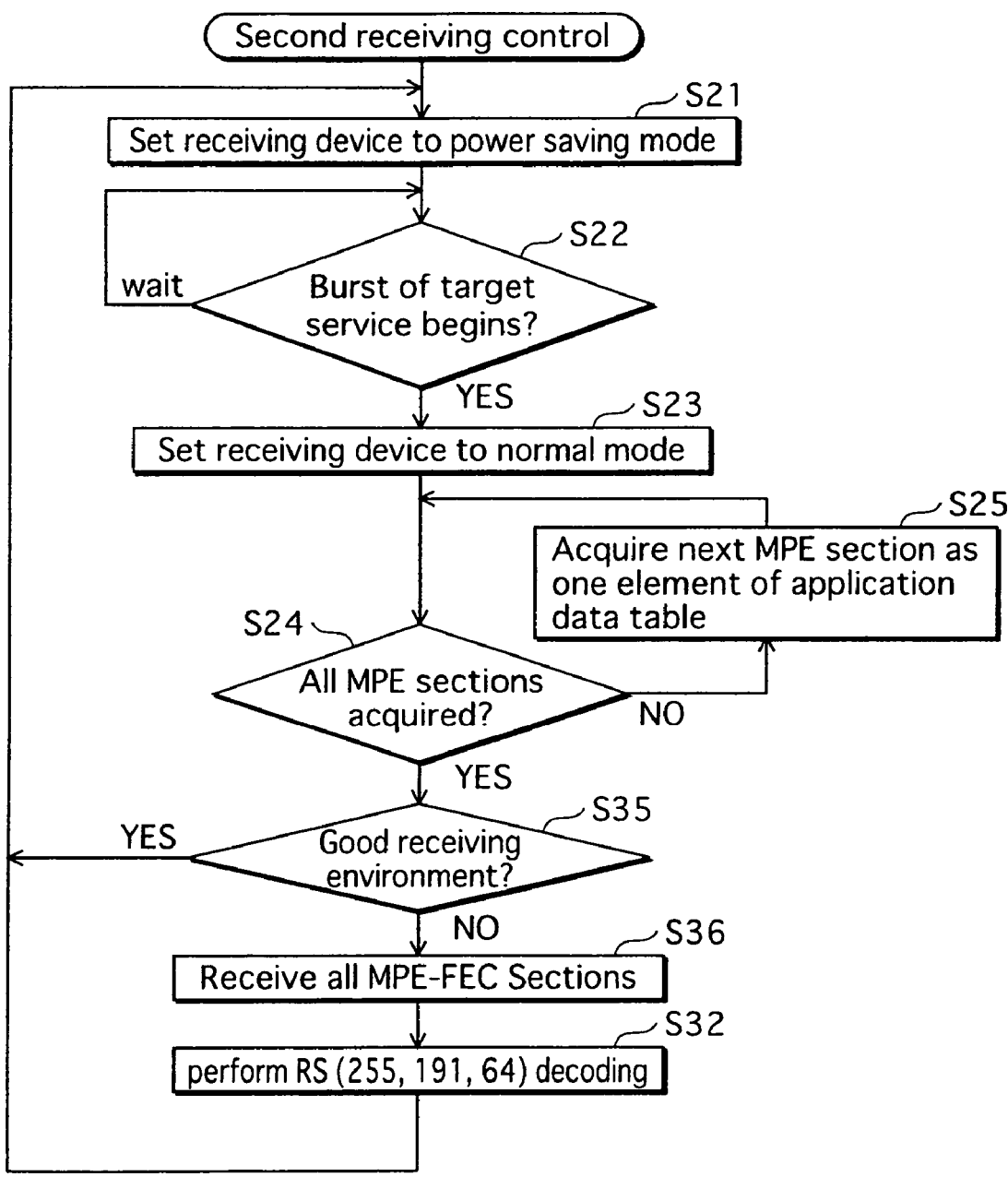
FIG. 20 is a flowchart showing a procedure of control by a demodulation circuit 10 and the power control unit 30 in the second embodiment.

FIG. 20 is a flowchart showing the control procedure of the FEC control unit 15 and the power control unit 30 in the second embodiment. In this flowchart, steps S35 to S36 have been provided instead of steps S26 to S30 and S32 in FIG. 18. Step S35 judges whether the receiving environment is good, using the receiving environment evaluation values. If the receiving environment is good, the procedure returns to step S21. If the receiving environment is bad, after receiving all MPE-FEC sections (step S36), error correction using RS (255, 191, 64) is executed (step S32).

Thus, according to this embodiment, for example when the receiving device remains almost static, the RS data table is not received at all, with it being possible to reduce the power consumption by about 25%. For example, once the receiving device has started to move, the same error correction as DVB-H is performed to ensure the receiving quality. In this way, a high-mobility receiving device can be realized.

Also, according to this embodiment, if the receiving environment is good or the receiving contents have no bit error, the power supply to part of the MPE-FEC unit 20 remains stopped. This contributes to a further reduction in power consumption.

THIRD EMBODIMENT

A third embodiment of the present invention relates to an improvement of combining the byte reliability determination unit 14 and the FEC control unit 15 of the first embodiment and the receiving environment detection unit 6 of the second embodiment in one receiving device.

Figure 21:
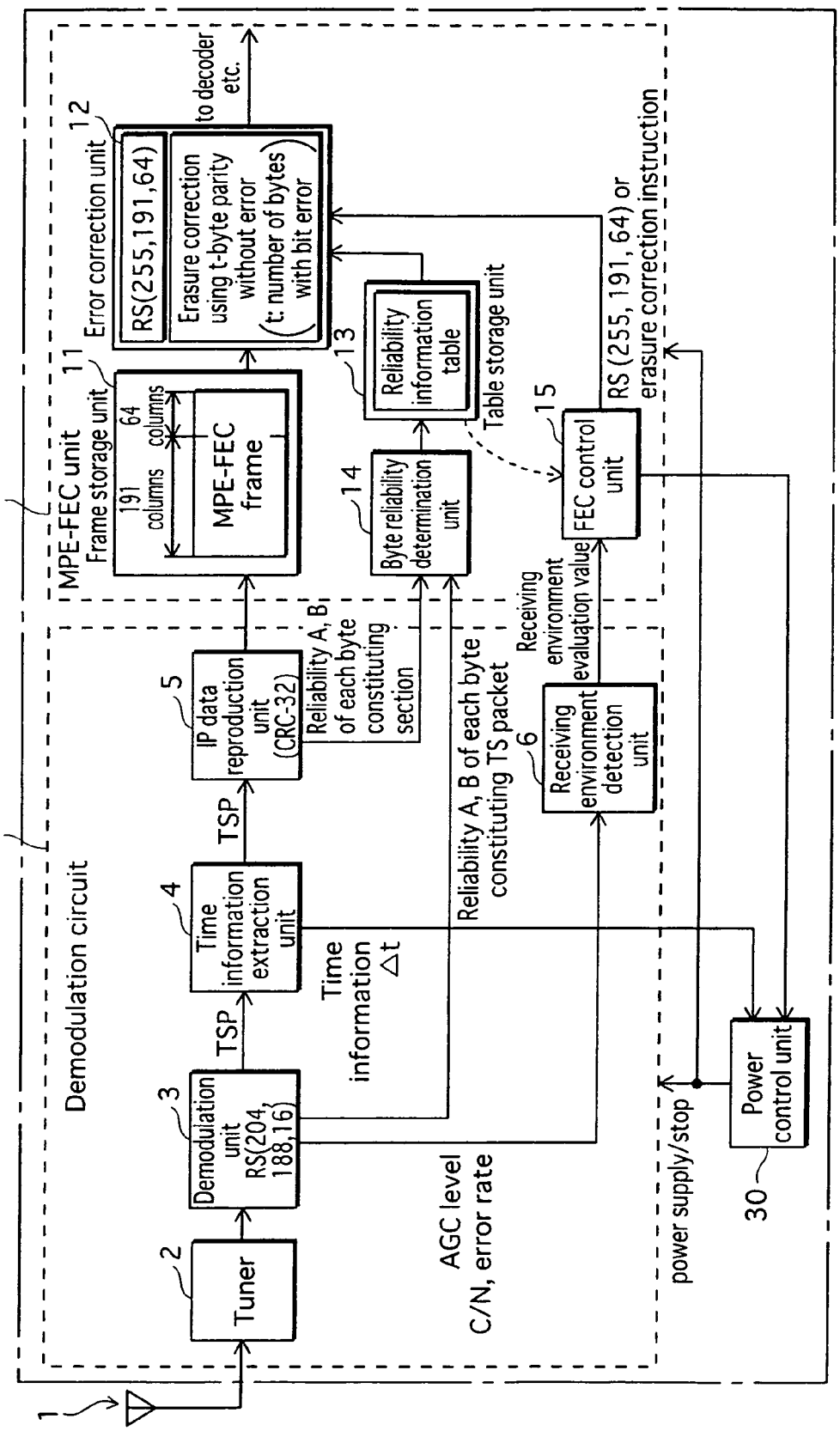
FIG. 21 shows an internal construction of a receiving device to which a third embodiment of the present invention relates.

FIG. 21 shows an internal construction of the receiving device to which the third embodiment of the present invention relates. The receiving device of the third embodiment differs from that shown in FIG. 8, in that the byte reliability determination unit 14, the reliability information table storage unit 13, and the receiving environment detection unit 6 are all included in the receiving device.

Figure 22:
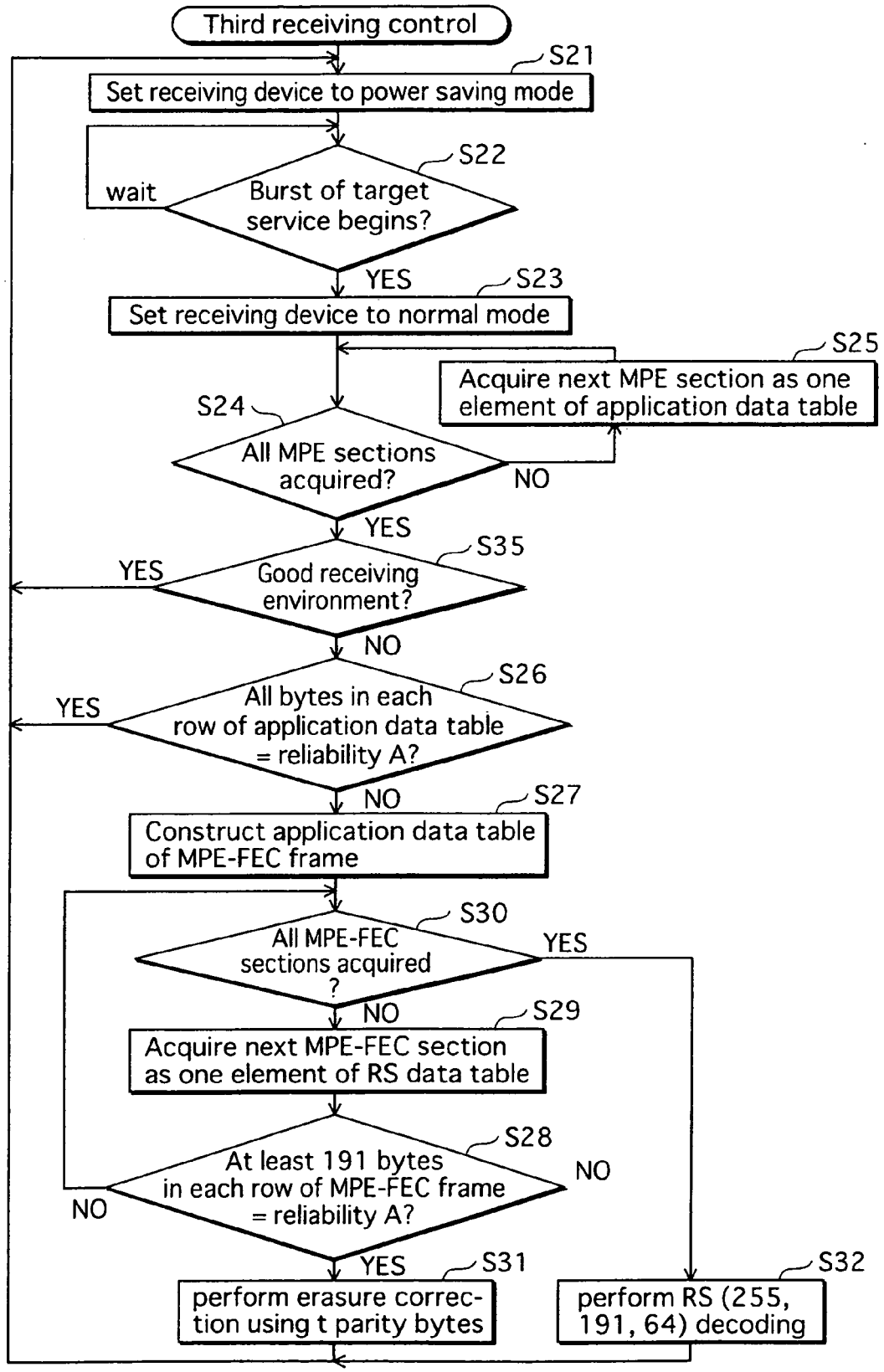
FIG. 22 is a flowchart showing a procedure of control by the FEC control unit 15 and the power control unit 30 in the third embodiment.

FIG. 22 is a flowchart showing a control procedure of the FEC control unit 15 and the power control unit 30 in the third embodiment. In this flowchart, step S35 has been provided between steps S24 and S26 in FIG. 18. Step S35 judges whether the receiving environment is good. If the receiving environment is good, the procedure returns to step S21. If the receiving environment is bad, steps S26 to S32 are performed in the same way as in FIG. 18.

Thus, according to this embodiment, if the receiving environment is good, the RS data table is not received at all, with it being possible to reduce the power consumption by about 25%. If the receiving environment is moderate, erasure correction is performed. If the receiving environment is bad, error correction using RS (255, 191, 64) is performed. In this way, the power consumption can be minimized even when the receiving environment changes all the time.

FOURTH EMBODIMENT

A fourth embodiment of the present invention relates to an improvement of setting different levels for the receiving environment evaluation values and executing error correction according to level in the receiving device of the third embodiment. Here, three levels of level 1 (good), level 2 (moderate), and level 3 (bad) are specified for the receiving environment evaluation values detected by the receiving environment detection unit 6.

Figure 23:
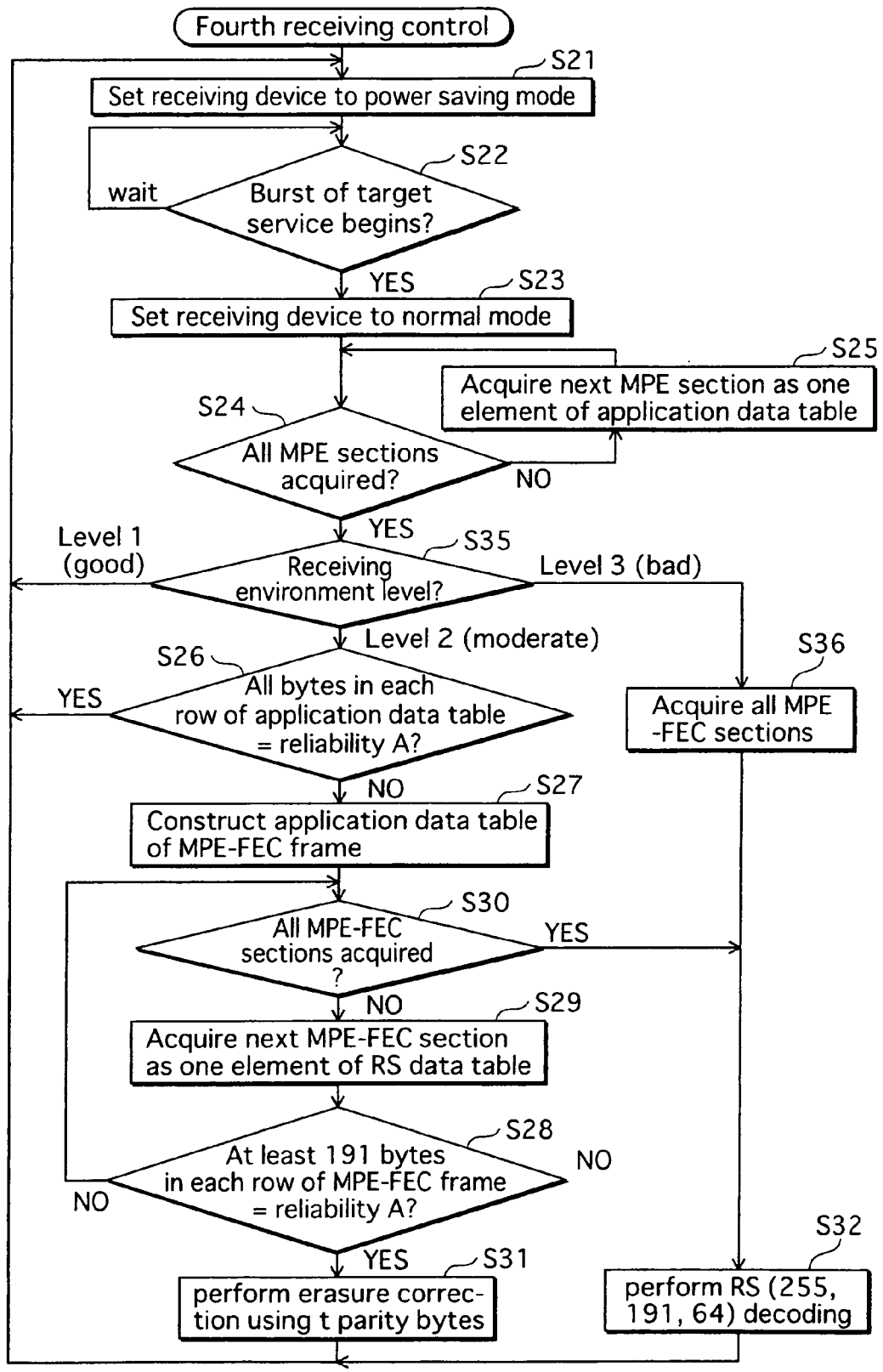
FIG. 23 is a flowchart showing a procedure of control by the FEC control unit 15 and the power control unit 30 in a fourth embodiment of the present invention.

FIG. 23 is a flowchart showing a control procedure of the FEC control unit 15 and the power control unit 30 in the fourth embodiment. In this flowchart, step S35 has been provided between steps S24 and S26 in FIG. 18. Step S35 judges whether the receiving environment is level 1 (good), level 2 (moderate), or level 3 (bad). If the receiving environment is level 1 (good), the procedure returns to step S21. If the receiving environment is level 2 (moderate), steps S26 to S32 are performed in the same way as in FIG. 18. If the receiving environment is level 3 (bad), step S36 is performed in the same way as in FIG. 20.

Thus, according to this embodiment, if the receiving environment is good, the RS data table is not received at all, with it being possible to reduce the power consumption by about 25%. If the receiving environment is moderate, erasure correction is performed. If the receiving environment is bad, error correction using RS (255, 191, 64) is performed. In this way, the power consumption can be minimized even when the receiving environment changes all the time.

(Remarks)

Although the above describes the best mode contemplated by the applicant of carrying out the present invention at the time of filing, further improvements and changes can be applied to the following technical aspects. It should be noted that whether to apply these improvements and changes can be determined arbitrarily by a person who practices the invention.

(Definition of the Power Saving Mode)

Matters such as how to control the power supply to the demodulation circuit 10 and the MPE-FEC unit 20 to reduce the power consumption and which state of the receiving device is to be regarded as the power saving mode can be arbitrarily determined when practicing the invention. Therefore, the power saving mode can be different from the one shown in the above embodiments. For example, a state where the power supply to the demodulation circuit 10 is low may be regarded as the power saving mode.

(Switching between MPE-FEC Error Correction and Erasure Correction)

MPE-FEC error correction to the MPE-FEC frame may be performed using the following method.

First, a number of bytes of each of reliability A and reliability B is counted in each row of the application data table. If all bytes of a row have reliability A, there is no need to perform error correction on the row. If the number of bytes of reliability B is 1 to 32, normal error correction or erasure correction is performed on the row.

If the number of bytes of reliability B is 33 to 64, errors can only be corrected by erasure correction, so that erasure correction is performed on the row.

If the number of bytes of reliability B is more than 64, erasure correction is impossible, so that normal error correction is performed on the row. Here, even if the number of bytes of reliability B is 64, some of these bytes of reliability B may actually not have an error, which leaves a possibility that the row may still be corrected by normal error correction.

(Timing of Erasure Correction)

By performing erasure correction on a row as soon as the number of bytes of reliability A becomes at least 191 in that row, real-time processing can be carried out. When counting the number of bytes according to reliability, if the number of bytes of reliability B exceeds 64 in a row, error correction according to reliability becomes impossible for the row. In such a case, it is necessary to receive the whole data and then perform normal error correction. When doing so, the amount of computation can be reduced by stopping the storage and counting of reliability information.

(Timing of Judging the Receiving Environment)

The timing of judging the receiving environment can be arbitrarily determined when practicing the invention. For example, the judgment of the receiving environment can be made during reception of part of MPE sections, or during reception of MPE-FEC sections.

If the receiving environment is very good, not only the MPE-FEC error correction but also the RS (204, 188, 16) decoding of TS packets may be omitted.

(Classifying the Receiving Environment by Level)

The fourth embodiment may be modified as follows. The classification of the receiving environment by level is conducted before acquiring an MPE section, based on previous receiving conditions. If the receiving environment is judged to be level 3 (bad), the reliability determination is not performed. In this way, the reliability determination and the storage of reliability information can be omitted. (DVB-H)

The above embodiments describe a receiving device of a multi-carrier format called DVB-H, but the present invention is equally applicable to a single-carrier receiving device that adapts a similar frame structure.

The above embodiments describe a receiving device of a time-division multiplex transmission system called DVB-H, but the present invention is equally applicable to a system which performs not time-division multiplex transmission but consecutive packet transmission, as long as a first part of a data structure is data and a latter part of the data structure is parity.

(Implementation of the Control Procedures)

The control procedures shown in the flowcharts and the control procedures executed by the functional construction elements in the above embodiments are actually realized by hardware resources. In this sense, these control procedures can be regarded as the creation of a technical idea utilizing natural laws. Hence these control procedures meet the requirement as an "invention of a program".

<Production of the Program According to the Present Invention>

The program according to the present invention can be produced in the following manner. First, a software developer creates source programs which realize the above flowcharts and functional construction elements using a programming language. When doing so, the software developer creates such source programs that realize the above flowcharts and functional construction elements, using class structures, variables, array variables, and calls for external functions according to a syntax of the programming language.

The created source programs are supplied to a compiler as files. The compiler translates these source programs to generate object programs.

The translation by the compiler is made up of processes such as syntax analysis, optimization, resource assignment, and code generation. In the syntax analysis, lexical analysis, syntax analysis, and semantic analysis of the source programs are performed to convert the source programs to intermediate programs. In the optimization, operations such as basic blocking, control flow analysis, and data flow analysis are performed on the intermediate programs. In the resource assignment, variables in the intermediate programs are assigned to registers or memories in a target processor, in order to adapt to an instruction set of the target processor. In the code generation, each intermediate instruction in the intermediate programs is converted to program code to thereby obtain the object programs.

The object programs generated in this way are made up of one or more pieces of program code for causing a computer to execute the individual steps of the flowcharts or functional construction elements in the above embodiments. There are various types of program code such as a processor's native code or JAVA (registered trademark) byte code. Also, there are various methods for realizing the individual steps by program code. If each step can be realized using an external function, a call statement for calling the external function serves as program code. Also, there is a case where program code for realizing one step belongs to separate object programs. For an RISC processor which has a limited set of instructions, each step of the above flowcharts may be realized by combining an arithmetic instruction, a logic instruction, a branch instruction, and the like.

Having generated the object programs, a programmer activates a linker for the object programs. The linker assigns the object programs and relevant library programs to memory areas and links them together to generate a load module. Such a generated load module is assumed to be read by a computer, and causes the computer to execute the procedures of the flowcharts and the procedures of the functional construction elements in the above embodiments. As a result of the above processes, the program according to the present invention can be produced.

<Example of Use of the Program According to the Present Invention>

The program according to the present invention can be used as follows.

(i) Use as an Embedded Program

When using the program according to the present invention as an embedded program, the load module which is the program is written to an instruction ROM together with a basic input/output program (BIOS) and various types of middleware (operation system). The instruction ROM is then incorporated in a control unit and executed by a CPU. In this way, the program according to the present invention can be used as a control program of the receiving device.

(ii) Use as an Application

When the receiving device is equipped with a hard disk, the basic input/output program (BIOS) is included in an instruction ROM, and various types of middleware (operation system) are preinstalled in the hard disk. Also, a boot ROM for activating a system from the hard disk is provided in the receiving device.

In this case, only the load module is supplied to the receiving device via a portable recording medium or a network, and installed in the hard disk as one application. As a result, the receiving device performs bootstrapping by the boot ROM to start the operation system, and has the CPU execute the application. In this way, the program according to the present invention is used.

The receiving device equipped with a hard disk can use the program according to the present invention as one application. Therefore, the program according to the present invention can independently be assigned, leased, or provided via a network.

(Implementation of the Demodulation Circuit 10 and the MPE-FEC Unit 20)

The demodulation circuit 10, the MPE-FEC unit 20, and the power control unit 30 shown in the above embodiments can each be realized as one system LSI. As an alternative, a combination of the demodulation circuit 10, the MPE-FEC unit 20, and the power control unit 30 can be realized as one system LSI.

A system LSI is a circuit generated by mounting bare chips on a high-density substrate and packaging them. The system LSI includes a construction in which a plurality of bare chips have an external structure like one LSI, by mounting the plurality of bare chips on a high-density substrate and packaging them (such a system LSI is called a multi-chip module).

There are two types of packaging for a system LSI, i.e. QFP (Quad Flat Package) and PGA (Pin Grid Array). QFP is a system LSI with pins being attached to four side faces of a package. PGA is a system LSI with a large number of pins being attached to an entire bottom surface.

There pins serve as interfaces to other circuits. Since pins in a system LSI have such interface functions, the system LSI can act as a core part of the receiving device when other circuits are connected to the pins of the system LSI.

The bare chips packaged in the system LSI form a "front end part", a "back end part", and a "digital processing part". The front end part digitizes an analog signal. The back end part converts data obtained as a result of digital processing to an analog signal, and outputs the analog signal.

Each construction element shown in the internal construction diagrams of the above embodiments is included in the digital processing part.

As mentioned earlier in the above "use as an embedded program" section, the load module which is the program, the basic input/output program (BIOS), and the various types of middleware (operation system) are written in the instruction ROM. Since the above embodiments especially relate to the production of the load module which is the program, the system LSI according to the present invention can be produced by packaging the instruction ROM storing the load module which is the program as a bare chip.

In actual implementation, SoC or SiP can be used and are desirable. SoC (System on Chip) is a technique of integrating multiple circuits into a single chip. SiP (System in Package) is a technique of combining multiple chips into a single package using a resin or the like. Through the above processes, the system LSI according to the present invention can be produced based on the internal construction diagram of the receiving device shown in each of the above embodiments.

An integrated circuit generated in the above manner is called an IC, an LSI, a super LSI, or an ultra LSI, depending on the integration degree.

Further, some or all of the construction elements of the receiving device may be implemented as one chip. Also, the integration is not limited to the above SoC and SiP, but maybe performed using a dedicated circuit or a general process. A FPGA (Field Programmable Gate Array) that can be programmed or a reconfigurable processor capable of reconfiguring connections and settings of circuit cells in an LSI may be used after producing the LSI. Also, if an integrated circuit technique that replaces an LSI emerges from advancement of semiconductor technology or other derivative technology, such a technique can be used for the integration of the functional blocks. For instance, biotechnology may be adapted in this way.

INDUSTRIAL APPLICABILITY

The above embodiments each disclose the internal construction of the receiving device to which the present invention relates, and the receiving device can be manufactured in volume based on the disclosed internal construction. In other words, the receiving device is capable of being industrially used. Hence the receiving device according to the present invention has industrial applicability.

The invention claimed is:

1. A receiving device that performs reception in a service period of a broadcast signal and switches to a power saving mode in an on-service period, the service period being composed of a first period during which an application data table is transmitted and a second period, following the first period, during which the Reed-Solomon (RS) data table is transmitted, comprising: a receiving circuit configured to perform reception in the first period to obtain the application data table, and perform reception in the second period; an error correction unit configured to selectively perform first correction that uses the whole RS data table and second correction that uses a part of the RS data table, to correct a bit error in the obtained application data table; and a switching unit configured to, when the bit error is corrected as a result of the error correction unit performing the second correction, switch to the power saving mode before the second period ends.

2. The receiving device of claim 1,
wherein the application data table is made up of a plurality of bytes arranged in a matrix,
the receiving device further comprises:
a detection unit operable to, when the receiving circuit obtains the application data table, detect a position of each byte which has the bit error, in each row of the obtained application data table,
the second correction is erasure correction that, if the detection unit detects the position of each byte which has the bit error in the row, corrects the bit error by using a same number of parity bytes as bytes which each have the bit error, and
the switching to the power saving mode by the switching unit is performed when, in the second period, the same number of parity bytes as the bytes which each have the bit error are added to the row.

3. The receiving device of claim 2,
wherein the first period is a period during which a plurality of transport packets generated by converting a plurality of data sections are transmitted,
each of the plurality of data sections includes a column of the application data table and cyclic code for the column,
the receiving circuit includes:
a section correction unit operable to correct the bit error in each data section by using the cyclic code; and
a packet correction unit operable to correct the bit error in each transport packet which constitutes the data section, by using correction code added to the transport packet, and
the detection by the detection unit is performed by specifying which column of the application data table the data section or the transport packet belongs to, when the section correction unit is unable to correct the bit error in the data section and the packet correction unit is unable to correct the bit error in the transport packet.

4. The receiving device of claim 2, further comprising:
a counting unit operable to count the number of bytes which each have the bit error in each row of the application data table, when the receiving circuit obtains the application data table,
wherein if the number of bytes counted by the counting unit is 0 in each row of the application data table, the switching unit switches to the power saving mode before the second period begins,
if the number of bytes counted by the counting unit is no more than a predetermined number in each row of the application data table, the error correction unit performs the second correction, and
if the number of bytes counted by the counting unit is more than the predetermined number in any row of the application data table, the error correction unit performs the first correction.

5. The receiving device of claim 1, further comprising:
a detection unit operable to detect information showing a receiving environment of the broadcast signal,
wherein if the detected information satisfies a predetermined condition, the switching unit switches to the power saving mode before the second period begins, and
if the detected information does not satisfy the predetermined condition, the error correction unit performs one of the first correction and the second correction.

6. The receiving device of claim 1, further comprising:
a detection unit operable to detect information showing a receiving environment of the broadcast signal,
wherein if the detected information shows a first level, the switching unit switches to the power saving mode before the second period begins,
if the detected information shows a second level, the error correction unit performs the first correction, and
if the detected information shows a third level, the error correction unit performs the second correction.

7. An integrated circuit included in a receiving device that performs reception in a service period of a broadcast signal, for executing control of switching to a power saving mode in a non-service period, the service period being composed of a first period during which an application data table is transmitted and a second period, following the first period, during which the Reed-Solomon (RS) data table is transmitted, characterized by: switching to the power saving mode before the second period ends when, among first correction that uses the whole RS data table and second correction that uses a part of the RS data table, the receiving device performs the second correction.

8. A program used in a receiving device that performs reception in a service period of a broadcast signal, for having a CPU in the receiving device execute control of switching to a power saving mode in a non-service period, the service period being composed of a first period during which an application data table is transmitted and a second period, following the first period, during which a Reed-Solomon (RS) data table is transmitted, characterized by: having the CPU switch to the power saving mode before the second period ends when, among first correction that uses the whole RS data table and second correction that uses a part of the RS data table, the receiving device performs the second correction.

9. A receiving method that performs reception in a service period of a broadcast signal and switches to a power saving mode in a non-service period, the service period being composed of a first period during which an application data table is transmitted and a second period, following the first period, during which a Reed-Solomon (RS) data table is transmitted, comprising: a receiving step of performing reception in the first period to obtain the application data table, and performing reception in the second period; an error correction step of selectively performing first correction that uses the whole RS data table and second correction that uses a part of the RS data table, to correct a bit error in the obtained application data table; and a switching step of, when the bit error is corrected as a result of the error correction step performing the second correction, switching to the power saving mode before the second period ends.

* * * * *